United States Patent
Prabhakar et al.

(10) Patent No.: US 9,328,489 B2
(45) Date of Patent: *May 3, 2016

(54) WATER-SAVING FAUCET

(71) Applicant: SensiTap, LLC, Bedford, NH (US)

(72) Inventors: Jay Prabhakar, Bedford, NH (US); Ron Magers, Essex, MA (US); George H. Ciolfi, Hampton, NH (US)

(73) Assignee: SensiTap, LLC, Bedford, NH (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/755,578

(22) Filed: Jun. 30, 2015

(65) Prior Publication Data

US 2015/0299991 A1 Oct. 22, 2015

Related U.S. Application Data

(62) Division of application No. 14/254,255, filed on Apr. 16, 2014, now Pat. No. 9,103,102.

(51) Int. Cl.

| F16K 11/16 | (2006.01) |
| --- | --- |
| E03C 1/04 | (2006.01) |
| F16K 31/60 | (2006.01) |
| F16K 31/524 | (2006.01) |
| F16K 21/04 | (2006.01) |

(52) U.S. Cl.
CPC ............... *E03C 1/0412* (2013.01); *E03C 1/04* (2013.01); *F16K 21/04* (2013.01); *F16K 31/524* (2013.01); *F16K 31/60* (2013.01)

(58) Field of Classification Search
CPC .. F16K 11/078; F16K 11/0782; E03C 1/0412
USPC ............... 137/625.17, 625.4, 625.41, 630.19, 137/630.2, 636.2, 636.3, 636.4, 801
See application file for complete search history.

(56) References Cited

U.S. PATENT DOCUMENTS

| 4,819,909 A * | 4/1989 | Hart ........................ F16K 21/06 251/48 |
| 4,960,154 A * | 10/1990 | Dagiantis ............ F16K 11/0787 137/597 |
| 5,082,023 A * | 1/1992 | D'Alayer de Costemore d'Arc .................... F16K 31/605 137/625.17 |
| 5,342,018 A * | 8/1994 | Wu ........................ F16K 31/54 251/250 |
| 5,522,429 A * | 6/1996 | Bechte .................. F16K 31/605 137/625.17 |
| 5,992,457 A * | 11/1999 | Humpert ............... F16K 31/605 137/625.17 |
| 6,796,544 B1 * | 9/2004 | Chen ..................... F16K 31/605 137/625.17 |
| 7,219,696 B2 * | 5/2007 | Cattaneo ............... F16K 31/605 137/625.4 |
| 7,357,154 B1 * | 4/2008 | Chen .................. F16K 11/0787 137/625.17 |
| 8,757,206 B2 * | 6/2014 | Carignan ................ F16K 21/04 137/625.41 |
| 9,103,102 B1 * | 8/2015 | Prabhakar ............. E03C 1/0412 |

\* cited by examiner

*Primary Examiner* — John K Fristoe, Jr.
*Assistant Examiner* — Reinaldo Sanchez-Medina
(74) *Attorney, Agent, or Firm* — Robert R. Deleault, Esq.; Mesmer & Deleault, PLLC

(57) ABSTRACT

A flow control assembly for a single lever faucet includes a coupler adapted to operatively connect a handle to a valve stem of a valve assembly. A cam mechanism has a valve stem portion and a handle portion, where the cam mechanism is operatively connected to the valve stem and the cam mechanism engages the valve stem to move the valve stem to a predefined open position in response to the handle being moved from a neutral handle position to a water on position. The coupler provides a biasing resistance that increases resistance to handle movement as the handle is oriented in a position other than a neutral handle position.

12 Claims, 16 Drawing Sheets

WATER-SAVING FAUCET

BACKGROUND OF THE INVENTION

1. Field of the Invention

The present invention relates generally to plumbing fixtures and more particularly to a water-saving faucet.

2. Description of the Prior Art

In a world where the human population is going to exceed 10 billion in the next decade or so, water and its availability will be the natural resource problem over which disputes will arise. The U.S. has a relative abundance of clean water provided through a reliable supply system. This very abundance, however, has also led to a lack of urgency in recognizing this coming natural resource problem. Water shortages are just a matter of time. They are inevitable. Particularly, this is and will become an even greater problem in the dry southwest of the country.

Several of the faucet types sold in the U.S. and overseas are of the handle (mixing valve) type, where one lifts or lowers the handle to increase or decrease the volume of flow and twists it right and left to change the temperature of the water. The typical 'throw' up and down distance is about one or two inches, between off and fully-open positions. It is very difficult for humans to accurately adjust the volume of water without paying particular attention to the task of turning on the water. However, this is a task people most often perform without much thought. Hence, most users almost always turn on the water full, even when only a small trickle of it is needed. This is a huge waste of this precious resource.

SUMMARY OF THE INVENTION

For purposes of this disclosure, the following definitions will apply.

A "single lever faucet" means a faucet where a single lever controls both the cold and hot water flow from the faucet.

A "cam mechanism" means any one of the following structures: a ratchet assembly, a Geneva mechanism, a lead screw, a ball screw, a freewheel mechanism, a one-way friction clutch, a geared arrangement, a plate cam, a cylindrical cam, a face cam, or a linear cam A "cam driving mechanism" that is electrical means an electric/electronic actuator such as a motor, solenoid, piezo, etc. acting on any of the previously listed structures of the cam mechanism.

Accurately controlling the water flow from single lever faucets is difficult. The primary reason controlling the flow accurately is difficult is due to a lack of feedback in the operation of faucets. In all things in nature, feedback is essential for efficient functioning. A person's hands know just how much pressure to exert on an egg when picked up, so that it isn't crushed. This is because the fingertips feed various sensory signals (pressure/force, temperature, wetness, etc.) back to the brain, which then interprets these signals relative to the task being performed and adjusts the pressure being applied to the egg accordingly. A person is not even consciously aware that one is making these adjustments—the reaction is instinctive and transparent to the person. Most such feedback is. All devices that are easy and intuitive to use have feedback which one uses subconsciously.

The lack of continuous feedback in the operation of faucets (known as running 'open loop') makes it such that the human brain is performing the task with only one point of feedback: when the faucet is either on full or off (i.e., at one limit of the handle's operating range or the other). Thus, when a faucet is turned on, a force is exerted on the handle until it reaches the upper limit of its travel. Conversely, when a faucet is turned off, the handle is pushed down until the opposite stop is reached and the water is shut off completely. This, too, is feedback, but it is not fine enough for a person to use efficiently in controlling the flow of water in between the two extremes of full off and full on. The feedback is said to not have enough resolution.

What is needed is a means of intuitively controlling water flow. The ideal way to do this would be to introduce 'force feedback' to the operation of the handle. When one initially exerts force on the handle to open it, there should be very little resistance to moving the handle. As the water starts to flow, it should exert an ever increasing force on the handle mechanism, causing the force required to operate the handle to increase, until the upper limit of travel is reached. This will tell the human brain (subconsciously) that more water is flowing and that they can stop pushing on the handle. Thus, feedback can be achieved, making the act of saving water subconscious.

The present invention will inherently cause users to think about how much water is being used and help them use only as much as is needed, without causing too much inconvenience.

The concept of the present invention is applicable to what are commonly known as 'mixing valves'. This type of faucet has a single handle that is raised and lowered to get water to flow at differing volumes (from no flow to maximum) and swiveled from side to side to change the ratio of hot water to cold, thus changing the temperature of the water output.

Typical usage of these faucets involves raising the handle of the faucet to get water to flow and lowering it to shut it off. Since there is no feedback to the user from the handle and the "throw" is so small, most users raise the handle as far as it will go, until it hits the end of travel. This results in maximum flow for as long as the faucet is open, even though the volume of water required might be less than the maximum delivered by the faucet.

Accordingly, it is an object of the present invention to change the behavior of water faucet users in a manner that results in a reduction in water usage.

It is another object of the present invention to provide a water faucet with a water flow feedback feature that either consciously or subconsciously (i.e. intuitively) imparts the act of saving water in a user.

The present invention achieves these and other objectives by providing a single-throw faucet that includes a faucet body, a faucet spigot, a single lever handle, a valve assembly and a water flow control assembly that is operatively connected between the handle and a valve stem of the valve assembly.

In one embodiment, the water flow control assembly includes a faucet valve coupler and a cam mechanism. The faucet valve coupler has an actuator element and a handle actuator where the actuator element supports the handle actuator. The faucet valve coupler provides a biasing resistance that increases resistance to handle movement as the handle is oriented in a position other than a neutral handle position. In one embodiment, the handle actuator has a biasing portion or is made of a material that provides the biasing resistance. The cam mechanism has a valve stem portion and a handle portion. The cam mechanism is operatively connected to the valve stem of the valve assembly of a single lever faucet to engage the valve stem and move the valve stem to a predefined open position in response to a predefined opening pressure applied to the handle when the handle is moved from a neutral handle position to a water on position.

In another embodiment, the faucet valve coupler includes a handle biasing member is connected between the actuator element and the handle of the single lever faucet to provide increased resistance to the handle when the handle is oriented in a position other than the neutral handle position.

In another embodiment, the cam mechanism is one of a ratchet assembly, a plate cam, a cylindrical cam, a face cam, and a linear cam. The cam mechanism includes a cam driving mechanism that mechanical, electro-mechanical or electrical.

In the embodiment where the cam mechanism is a ratchet assembly, the ratchet assembly includes an actuator cam, a pawl, a pawl biasing member, and a pawl release cam. The actuator cam has a plurality of detents and where the actuator cam is directly connected to the valve stem of the valve assembly of a single lever faucet. The pawl has detent engaging portion that may selectively engage with one of the plurality of detents on the actuator cam. The pawl biasing member is connected to the pawl and oriented to bias the detent engaging portion of the pawl into one of the plurality of detents when the handle of the single lever faucet is moved to a water on position. The pawl release cam has a pawl release surface that is engaged by the detent engaging portion of the pawl to orient the pawl into a detent release position when the handle of the single lever faucet is moved to a water off position.

In another embodiment of the present invention, the water flow control assembly includes a valve closing element that engages the valve stem to orient the valve stem to a water off position when the handle of the single lever faucet is moved to the water off position. The valve closing element may be an angled handle surface on an inside portion of the handle that engages the handle actuator, which has a valve closing surface that contacts the valve stem. The valve closing element may be a handle actuator member directly connected to the handle actuator where the handle actuator member has valve closing surface that contacts the valve stem.

In another embodiment, there is a disclosed a method of controlling the flow of water from a single lever faucet. The method includes coupling a water flow control assembly between a handle of a single lever faucet and a valve assembly of the single lever faucet. The flow control assembly engages a valve stem of the valve assembly, is adapted to provide an increased handle resistance to a user when the handle is moved from a handle neutral position to a water on position, is adapted to automatically select a predefined valve stem position that is directly related to a predefined water flow when moving the handle from the neutral position to the water on position, and is configured to automatically return the handle to the handle neutral position after engagement by the user to the water on position or to the water off position.

In another embodiment of the method, the automatically selected flow position is based on the force applied by the user to the handle.

In another embodiment of the method, the method includes selecting a water flow control assembly that includes a hot water by-pass feature that enables rapid delivery of hot water.

In still another embodiment of the method, the method includes selecting a water flow control assembly that includes a resistance mechanism that provides force feedback to the user when the handle is moved to a non-indexed, further-open position that is not one of the predefined flow positions.

In another embodiment, there is disclosed a method of controlling the use of water from a faucet. The method includes providing an indexing system in a single lever faucet to control water flow from the single lever faucet. The indexing system includes (1) providing a predefined flow rate when the single lever faucet is moved from a closed flow position to a full open position, the predefined flow rate being less than a flow rate of a full open position for a single lever faucet without an indexing system, (2) providing a force-feedback to a user of the single lever faucet incorporating the indexing system wherein the force-feedback imparts an increased resistance force of the faucet lever proportional to the distance of travel of the lever from the closed position to the full open position, and (3) providing a predefined increase in flow rate with each subsequent movement of the lever of the faucet from the closed position to the full open position where the number of subsequent movements of the lever is predefined by the indexing system, each subsequent movement being available so long as the lever of the single lever faucet is not engaged to stop the flow of water from the single lever faucet.

DETAILED DESCRIPTION OF THE INVENTION

Figure 1:
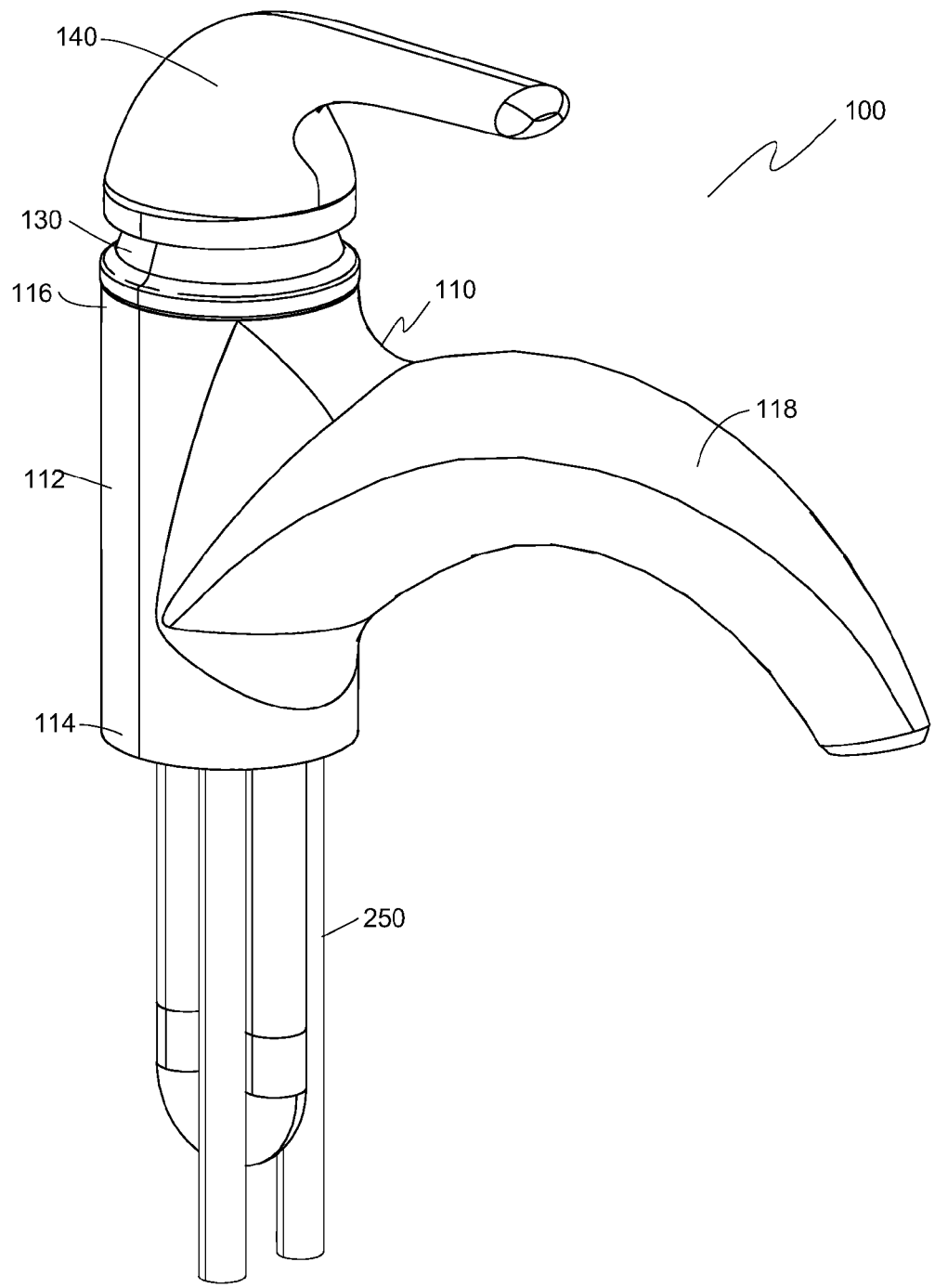
FIG. 1 is a perspective view of one embodiment of single lever faucet of the present invention.

The present invention is illustrated in FIGS. 1-22. FIG. 1 shows a perspective of one embodiment of a single lever faucet 100 that includes a valve assembly 159 (not visible), a water flow control assembly 160 (not visible), a housing 110, a handle 140, and a valve manifold 250. A first portion 252 (not shown in FIG. 1) of valve manifold 250 is shown extending from housing 110. Housing 110 includes a faucet body 112 with lower end 114 and an upper end 116 and a spigot 118 that extends transversely from faucet body 112. A flow control cover 130 is disposed between handle 140 and faucet body 112 and abuts upper end 116 of faucet body 112. Flow control cover 130 conceals portions of valve assembly 159 and water flow control assembly 160, which is discussed below.

Figure 2:
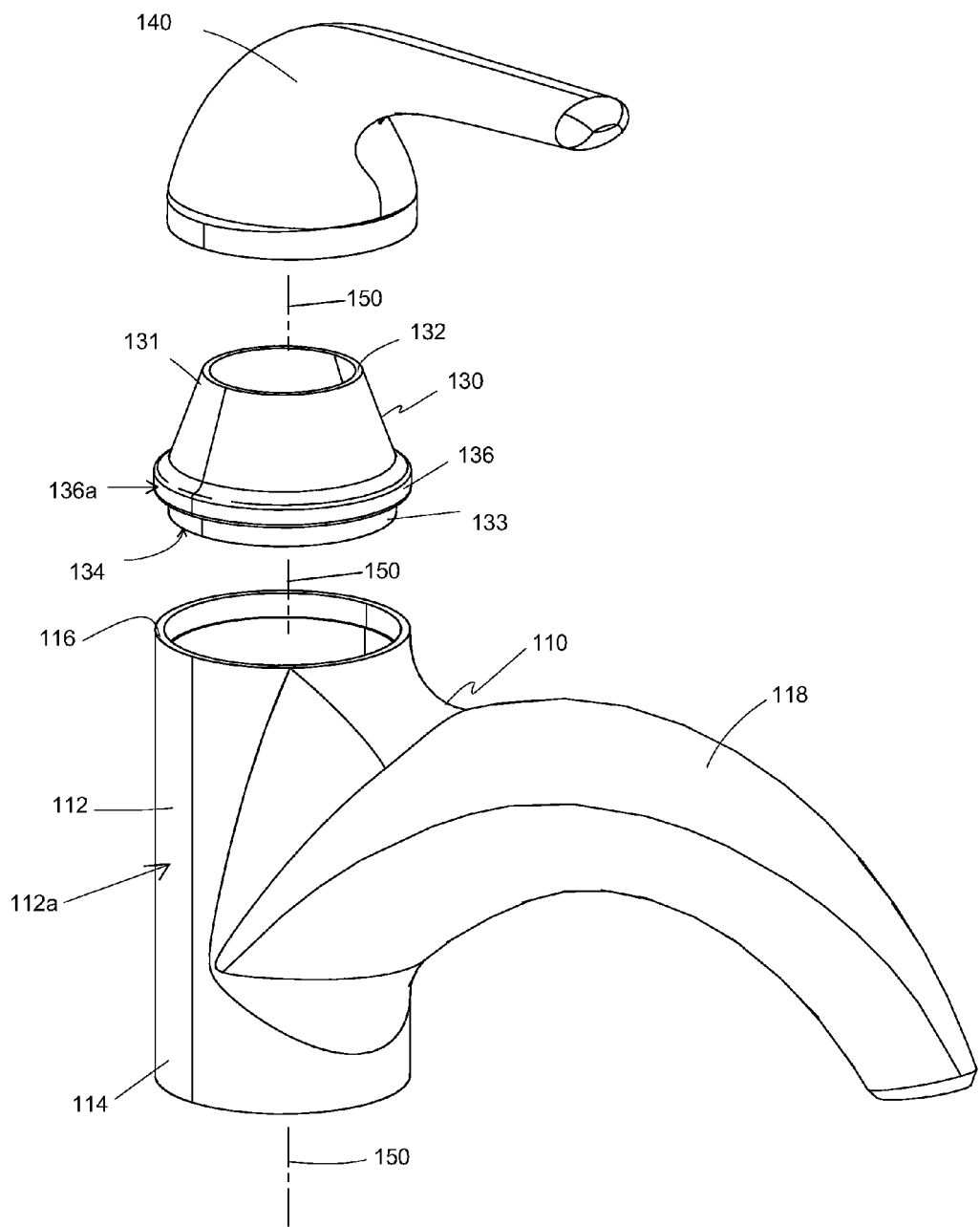
FIG. 2 is a perspective, exploded view of a faucet housing showing a handle, a flow control cover, and a faucet body.

Referring now to FIG. 2, a perspective exploded view shows housing 110, flow control cover 130, and handle 140. In one embodiment, faucet body 112 has the general shape of a hollow cylinder and extends along a central vertical axis 150 from open upper end 116 to open lower end 114. Spigot 118 is also hollow and joins faucet body 112.

Flow control cover 130 is hollow and has a frustoconical shape extending axially along central vertical axis 150. An upper cover end portion 131 has upper flow control cover opening 132 and a lower cover end portion 133 has lower flow control cover opening 134. A flange 136 extends circumferentially around and extends radially outward from lower cover end portion 133 of flow control cover 130. Outer flange diameter 136a is substantially equal to an outer body diameter 112a of faucet body 112. Therefore, lower cover end portion 133 is received in upper end 116 of faucet body 112 with flange 136 close to or abutting upper end 116. Flow control cover 130 attaches to faucet body 112 by a threaded connection, frictional fit, snap fit, or loose fit between flow control cover 130 and body portion 112.

Figure 3:
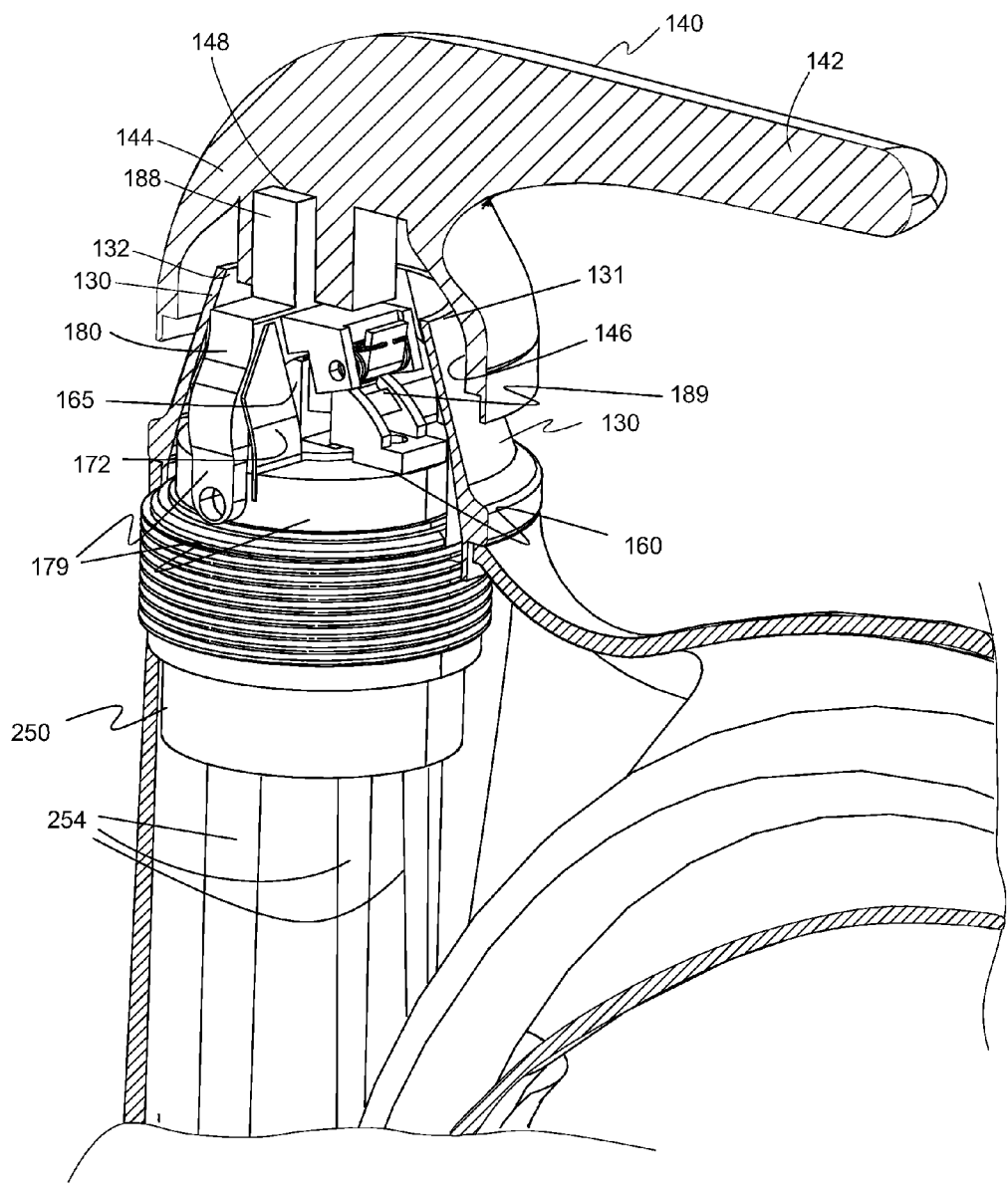
FIG. 3 is a perspective, partial cutaway view of a single lever faucet showing portions of the valve assembly.

Referring now to FIG. 3, a perspective, partial sectional view of single lever faucet 100 shows a section of handle 140, a section of flow control cover 130, a water flow control assembly 160 attached to a valve stem 165, and an upper portion 254 of valve manifold 250. In one embodiment, water flow control assembly 160 includes a faucet valve coupler 179 and a water flow control assembly 160. Water flow control assembly 160 includes a cam mechanism 189 and a handle biasing member 172. Components of water flow control assembly 160 are discussed in more detail below with reference to FIGS. 4 and 5.

Handle 140 has a handle stem 142 and a handle body 144. In one embodiment, handle body 144 defines a hollow region 146 sized to receive upper cover end portion 131 of flow control cover 130 and to permit handle body 144 to pivot and rotate about central vertical axis 150 during operation of single lever faucet 100. Handle body 144 also defines an opening or stem recess 148 for operatively connecting to valve assembly 159.

Flow control cover 130 partially encloses valve assembly 159. Flow control cover 130 allows actuator element 188 of a handle actuator 180 to extend upwardly through upper flow control cover opening 132 to engage stem recess 148 of handle 140. By connecting to handle actuator 180 and having a water flow control assembly 160 operatively connected between handle 140 and valve stem 165, handle 140 is used to operate valve stem 165.

Figure 4:
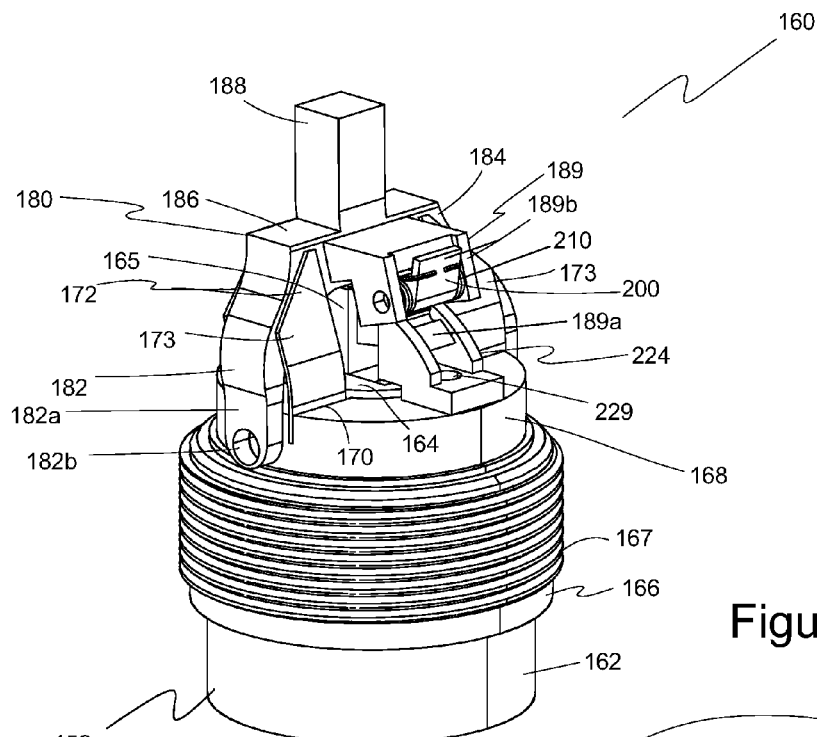
FIG. 4 is a perspective view of the valve assembly of FIG. 3.
Figure 5:
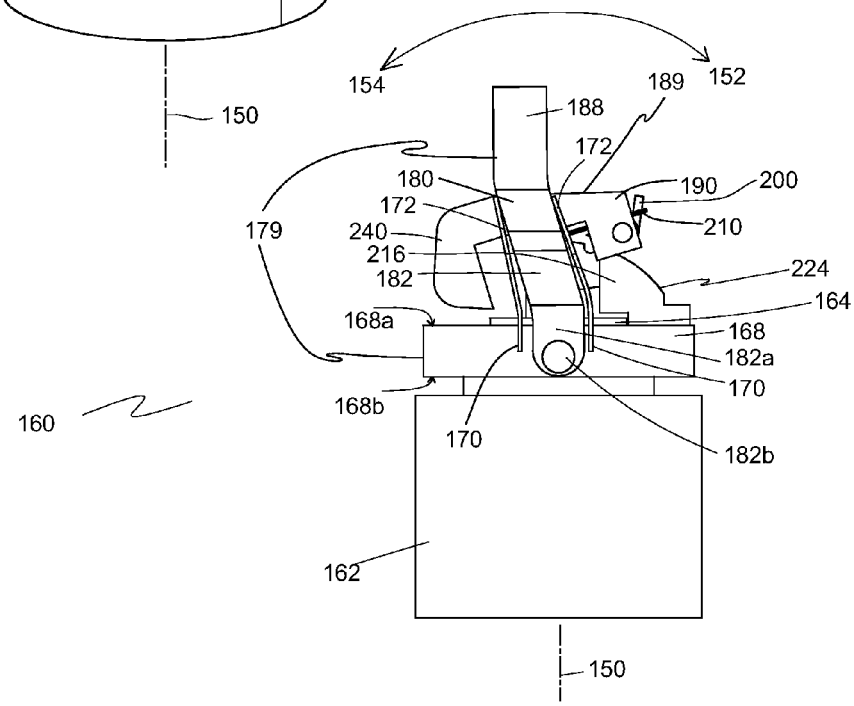
FIG. 5 is a side view of the valve assembly of FIG. 4 shown for clarity purposes without the cartridge lock.

Referring now to FIGS. 4 and 5, a front perspective view and a side view, respectively, illustrate one embodiment of water flow control assembly 160 attached to valve assembly 159. A valve body 162 has a cylindrical shape with a void to receive a valve regulator 164 (not visible). A valve stem 165 extends upwardly from valve regulator 164. Valve body 162 and valve regulator 164 control the relative quantities of hot and cold water dispensed by single lever faucet 100, all as is well known in the art. A cylindrical cartridge lock 166 (not shown in FIG. 5) comprising a plurality of threads 167 is adapted to be secured to valve body 162. Cartridge lock 166 enables valve assembly 159 to be threadably received by and maintained in valve manifold 250, which is discussed in more detail below.

A faucet valve coupler 179 connects handle 140 to valve assembly 159. Faucet valve coupler 179 rotates and includes an actuator member 168 and a handle actuator 180. Actuator member 168 is connected to valve body 162 and is rotatable with valve stem 165. In one embodiment, actuator member 168 has an annular shape with a top surface 168a, a bottom surface 168b, an actuator ring opening 168a sized to receive and rotate about regulator 164, and a plurality of slots 170. In another one embodiment, actuator member 168 has a perimeter wall 168e (not shown) that extends vertically below bottom surface 168b similar to a cap. Perimeter wall 168e partially encloses or is received in valve body 162. In one embodiment, slots 170 extend into top surface 168a of actuator member 168 to receive an end or ends of a biasing member 172. In the embodiment of FIGS. 4-5, biasing member 172 comprises a plurality of spring plates 173 positioned on opposite faces of handle actuator 180. Biasing member 172 extends upwardly from actuator member 168 to engage handle actuator 180.

A handle actuator 180 has a first arm 182, a second arm 184 spaced apart and generally perpendicular to first arm 182, and a transverse portion 186 extending between and connecting first arm 182 to second arm 184. First arm 182, second arm 184, and transverse portion 186 can be straight segments, curved segments, or have other shapes that generally define an inverted-U shape that extends over valve regulator 164. a handle portion 188 extends from transverse portion 186 generally parallel to central vertical axis 150 in a direction opposite to that of first arm 182 and second arm 184. End 182a of first arm 182 and end 184a of second arm 184 each pivotably connect to opposite sides of actuator member 168. In one embodiment, ends 182a, 184a abut an outside surface 168c of actuator member 168 and have connector openings 182b, 184b, respectively, corresponding to connector openings 168d extending radially into or through actuator member 168 (shown in FIG. 6). In such an embodiment, handle actuator 180 pivots about pins or connectors (not shown) extending into or through connector openings 182b, 184b of actuator member 168. In other embodiments, ends 182a, 184a pivotably connect to top surface 168a of actuator member 168 or other location suitable to permit rotation and pivoting of handle actuator 180 relative to central vertical axis 150.

As illustrated in FIG. 5, when handle actuator 180 is pivoted in a forward direction 152 (e.g., toward user) or backward direction 154 (e.g., away from user) about connector openings 182b, 184b, some or all of biasing member 172 engage handle actuator 180 to bias its return to a neutral position as shown in FIG. 5. For example, when biasing member 172 comprises spring plates 173, only some of spring plates 173 engage handle actuator 180 in the pivoted position since handle actuator 180 pivots out of engagement with the opposing spring plates 173. Operation of single lever faucet 100 is discussed in more detail below.

Still referring to FIGS. 4 and 5, a cam mechanism 189 includes a valve stem portion 189a and a handle portion 189b. Cam mechanism 189 can be a mechanical, electro-mechanical, or electrical mechanism that is used to incrementally adjust the position of valve stem 165, and therefore the flow of water through valve assembly 159. In one embodiment in which cam mechanism is a mechanical mechanism, stem portion 189a includes an actuator cam 216 and handle portion 189b includes a pawl 200 connected directly or indirectly to handle 140. In one embodiment, a pawl mounting bracket 190 on handle actuator 180 pivotably connects pawl 200 to handle actuator 180.

Pawl 200 (shown more clearly in FIG. 6) is received in pawl mounting bracket 190 using one or more pins, fasteners, or the like extending through bracket through-openings 195. One or more pawl biasing member 210 are used to bias pawl 200 towards engagement with actuator cam 216. In one embodiment, pawl biasing member 210 is a torsion spring mounted to pawl mounting bracket 190 alongside pawl 200.

Actuator cam 216 is attached to valve stem 165. In one embodiment, a fastener, pin, or the like (not shown) extends from valve stem 165 into actuator cam 216 to directly connect actuator cam 216 to valve stem 165. Other mounting or connection methods are acceptable. Actuator cam 216 is discussed in more detail below with reference to FIG. 6.

A pawl release cam member 224 is mounted to actuator member 168. In one embodiment, a connector opening 229 extends completely through release cam member 224 for attaching pawl release cam member 224 to top surface 168a of actuator member 168. Other attachment methods are acceptable, including welding, adhesive, clips, and other means. It is contemplated that pawl release cam member 224 and actuator member 168 may also me molded into a single piece.

Figure 6:
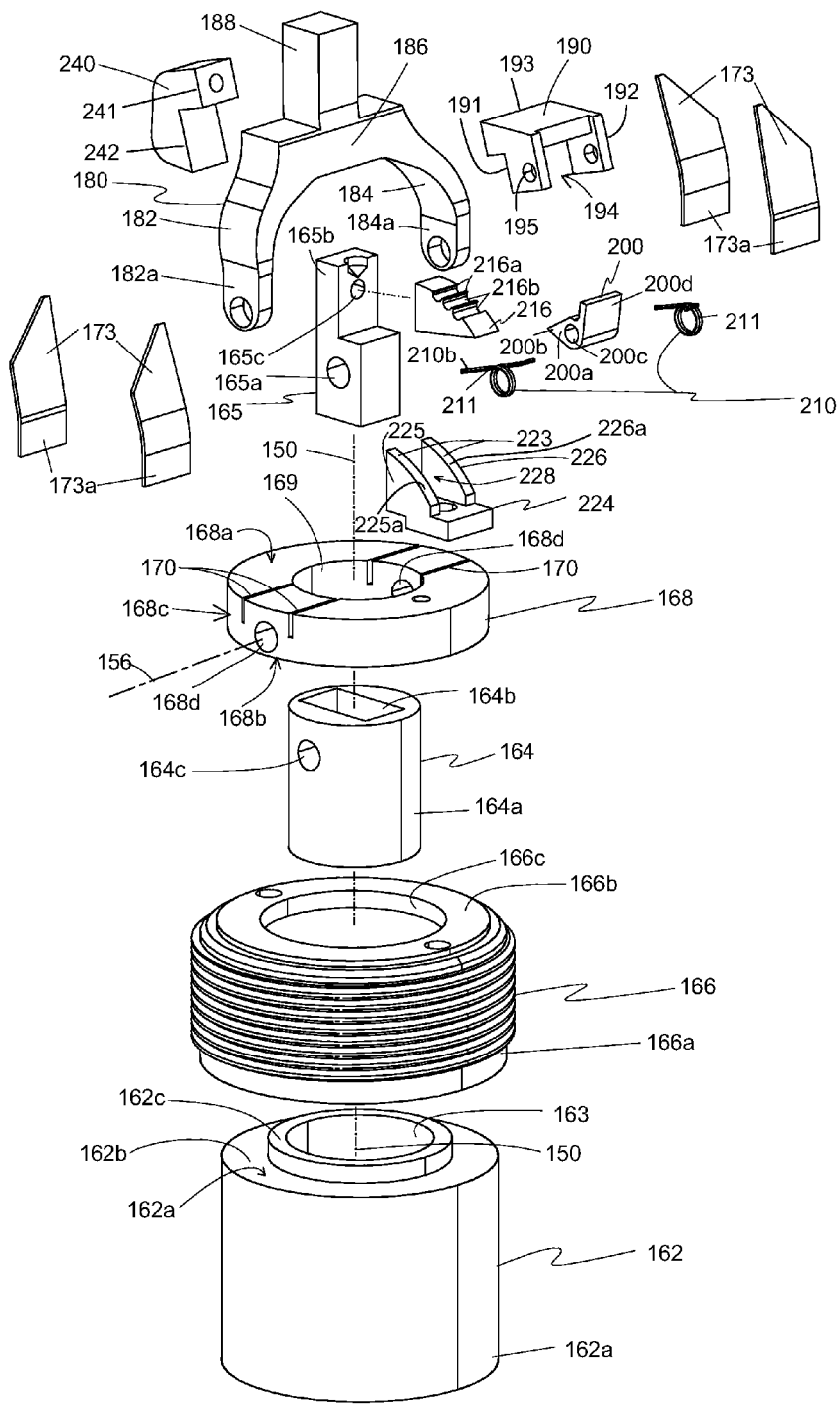
FIG. 6 is a perspective, exploded view of components of the valve assembly of FIG. 4.

Referring now to FIG. 6, a perspective exploded view shows components of one embodiment of water flow control assembly 160 coupled to valve assembly 159. Cylindrical valve body 162 extends along central vertical axis 150 and has a cylindrical valve body opening 163 to receive valve regulator 164. Valve body upper surface 162a defines a shoulder 162b with a raised collar or lip 162c around valve body opening 163.

Figure 7:
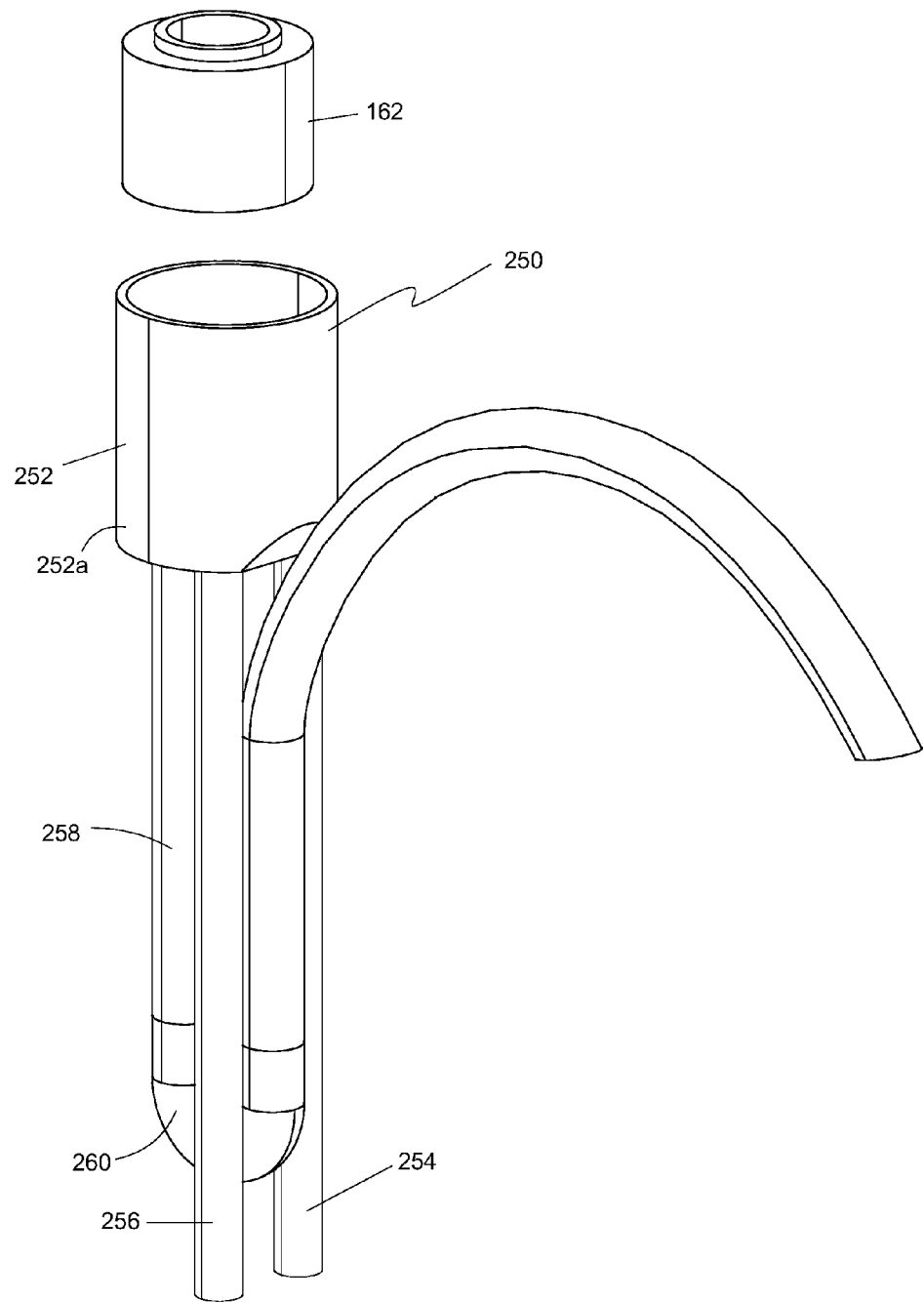
FIG. 7 is a perspective, exploded view of a valve housing and a valve manifold.

Valve body 162 has a cylindrical shape received by manifold 250 (shown in FIG. 7). Valve body 162 and regulator 164 together controls the amount of water flowing from manifold 250 through valve assembly 160. In some embodiments, valve body 162 and regulator 164 also control the balance between a first liquid (e.g., hot water) and a second liquid (e.g., cold water).

Cartridge lock 166 has a hollow cylindrical body portion 166a with external threads 167. An annular cartridge top 166b extends radially inward from body portion 166a and defines a central top opening 166c sized to receive collar 162c of valve body 162. Cartridge lock 166 slips over valve body 162 with cartridge top 166b in contact with shoulder 162b and with collar 162c substantially flush with cartridge top 166b.

Regulator 164 has a cylindrical body 164a with a rectangular through-opening 164a extending therethrough along central vertical axis 150. Through-opening 164a in other embodiments is oblong. Fastener openings 164c extend through regulator body 165a transverse (e.g., perpendicular) to central vertical axis 150. When regulator 164 is received in valve body 162, fastener openings 164c are exposed above collar 162c of valve body 162. For clarity, the inlet and outlet openings typical of regulator 164 used in single lever water faucets are not shown. It is understood by those skilled in the art that regulator 164 may be any one of the designs/shapes typically used in single lever water faucets, such as spherical, cylindrical, and the like.

Actuator member 168 has an annular shape with substantially parallel top surface 168a and bottom surface 168b. Fastener openings 168d extend from outside surface 168c through to actuator body opening 169. When assembled, actuator member 168 is aligned centered on central vertical axis 150 with valve regulator 164 and valve body 162 with bottom surface 168b close to cartridge top 166b. Fastener openings 168d of actuator member 168 align with fastener openings 164c of valve regulator 164 where fasteners, pins or similar structure (not shown) extending through fastener openings 168d, 164c connect actuator member 168 to valve regulator 164. Actuator member 168 is attached to valve regulator 164, which rotates within valve body opening 163 to control the proportions of a first liquid (e.g., hot water) and a second liquid (e.g., cold water) entering valve body 162 from manifold 250 (shown in FIG. 7).

Ends 173a of spring plates 173 are received in slots 170 in top surface 168a of actuator member 168. In other embodiments, spring plates 173 are replaced by a flexure member substantially having an inverted-U shape with ends received in slots 170. Pawl release cam 224 as discussed above is fixed to top surface 168a of actuator member 168 with release cam channel 228 directed toward central vertical axis 150. Pawl release cam 224 is fixed to top surface 168a using a fastener, pin, rivet, adhesive, or other suitable method. It is contemplated that pawl release cam member 224 and actuator member 168 may also be molded into a single piece.

Valve stem 165 is received in opening 164b of valve regulator 164 and configured to be secured with or without a fastener. In an embodiment where a fastener is used, one example includes a stem fastener opening 165a that extends through valve stem 165 transversely to central vertical axis and aligns with fastener openings 164c of valve regulator 164. To control the flow rate of liquids through valve assembly 160, valve lever 164 pivots about a transverse pivot axis 165 extending through stem fastener opening 165a, fastener openings 168d of actuator member 168, and fastener openings 164c of valve regulator 164.

Actuator cam 216 attaches to an upper portion 165b of valve stem 165. In one embodiment, a threaded fastener (not shown) extends through a cam attachment opening 165c to threadably engage actuator cam 216. It is contemplated that actuator cam 216 and valve stem 165 may also be molded into a single piece. In one embodiment, actuator cam has a wedge shape with a plurality of teeth 216a and cam detents 216b between adjacent teeth 216a. Other shapes for actuator cam 216 are also acceptable, such as a rod or wheel with teeth 216a and detents 216b. Examples of actuator cams include, but are not limited to, a plate cam, a cylindrical cam, a face cam, and a linear cam.

Handle actuator 180 has first arm 182, second arm 184, and transverse portion 186 substantially defining an inverted-U shape. Handle portion 188 extends upwardly from transverse portion 186 to engage handle 140 (shown in FIG. 3). Handle actuator 180 pivotally attaches to actuator member 168 at arm end portions 182a, 184a, respectively, of first arm 182 and second arm 184. In one embodiment, handle actuator 180 pivots about transverse pivot axis 156 with the inverted-U shape pivoting over valve stem 165. In one embodiment, actuator element 188 aligns with valve stem 165 as a virtual extension of valve stem 165.

In another embodiment, handle actuator 182 comprises biasing member 172 made of relatively flat and thin metal that is flexible and resilient. In such an embodiment, ends 182a, 184a of handle actuator 182 are received in slots 170 of actuator member 168. It is contemplated that a torsion spring may be installed between actuator member 168 and handle actuator 182 to impart a biasing action to actuator member 168 instead of the flat, thin metal of biasing member 173 shown in FIGS. 5 and 6.

In one embodiment, pawl mounting bracket 190 has a first side member 191, a second side member 192 and a top member 193 extending between and connecting first side member 191 to second side member 192, where pawl mounting bracket 190 defines a bracket passageway 194 below top member 193 and between first side member 191 and second side member 192. In one embodiment each of first side member 191 and second side member 192 defines a bracket through-opening 195 extending transversely therethrough. Pawl mounting bracket 190 attaches to transverse portion 186 of handle actuator 182 with first side member 191 and second side member 192 extending downwardly towards actuator cam 216. Pawl 200 is pivotably mounted between first side member 191 and second side member 192. In one embodiment, pawl 200 has a wedge-shaped pawl body 200a with a detent engaging portion 200b, such as a tip or point, and a recess or through-hole 200c for mounting to pawl mounting bracket 190. A pawl lever 200d extends transversely from pawl body 200a.

One or more pawl biasing members 210 bias pawl 200 towards an engaged position with actuator cam 216 where detent engaging portion 200b engages or is positioned to engage a detent 216b on actuator cam 216. In one embodiment, pawl biasing member 210 is one or more torsion springs 211 having a coil 211a, an extension arm 211b, and an engaging arm 211c. Torsion spring(s) 211 are mounted alongside pawl 200 between first side member 191 and second side member 192 of pawl mounting bracket 190. In such an embodiment, a pin or fastener used to mount pawl 200 also extends through coil 210a. Extension arm 200b extends into or through bracket passageway 194 and engaging arm 210c bends to engage pawl lever 200d. With this arrangement, tension springs 211 exert a force on pawl lever 210d that causes pawl to pivot with detent engaging portion 200b in a position to engage actuator cam 216. In other embodiments, a protrusion or notch on first side member 191 and/or second side member 192 is used to retain pawl 200 where pawl 200 would have corresponding recesses or axles on the sides of pawl body 200a, respectively.

Pawl release cam 224 has a first release cam member 225 and a second release cam member 226 spaced apart and substantially parallel to each other. A bottom release cam member 227 extends between and connects first release cam member 225 to second release cam member 226. First and second release cam members 225, 226 extend generally upward in a direction parallel to central vertical axis 150 from top surface 168a and/or from bottom release cam member 227. First and second release cam members 225, 226 define a release cam channel 228 therebetween sized to receive actuator cam 216.

A pawl release surface 223 on pawl release cam 224 releases pawl 200 from engagement with actuator cam 216. In one embodiment, pawl release surface 223 includes one or both of top surfaces 225a, 226a of first and second release cam members 225, 226, respectively. In such an embodiment, first and second release cam members 225, 226 contacting pawl 200 as handle actuator 180 (and pawl 200) pivot towards a water off position, thereby causing pawl 200 to pivot out of engagement with detent 216b of actuator cam 216. This occurs because pawl 200 is wider than cam channel 228, therefore pawl 200 engages pawl release surface 223, which includes one or both of top surfaces 225a, 226a of first and second release cam members, respectively. In other embodiments, pawl biasing members 210 engage first release cam member 225 and second release cam member 226, thereby releasing the bias on pawl 200 and causing pawl 200 to disengage from actuator cam 216.

In one embodiment, when handle 140 is moved to a water off position and pivots handle actuator 180 forward as viewed in FIG. 6, extension arms 210b of torsion springs 211 engage pawl release surface 223 that includes top sloping surface of first and second release cam members 225, 226, respectively. As handle actuator 180 pivots further forward, pawl release surface 223 on first and second release cam members 225, 226 engage with and pivot pawl 200 to a disengaged position where detent engaging portion 200b is lifted/pivoted and disengaged from actuator cam 216.

In one embodiment, a valve closing member 240 is attached to transverse member 186 of handle actuator 180 opposite of pawl mounting bracket 190 (i.e., valve closing member 240 is attached to the back side of handle actuator 180.) In one embodiment, valve closing member 240 is substantially L-shaped with a first closer portion 241 connecting transversely to transverse member 186 and a second closer portion 242 extending downwardly towards actuating ring 168. Valve closing member 240 restricts the throw of handle 140 in an upwards pivot of the handle towards an open position by second closer portion 242 contacting actuator member 168. When handle 140 is operated to the water off position with a downwards pivot of handle 140, second closer portion 242 engages valve stem 165 to return it to its vertical or off position. In other embodiments, valve closing member 240 is optionally replaced with a catch or protrusion from handle actuator 180 or other component that closes valve stem 165 when handle 140 is moved to the water off position. That is, it is like a desmodromic valve in that valve closing member 240 has a different control function when actuated in different directions: valve closing member 240 acts as a stop when handle 140 is operated to the water on position; valve closing member 240 acts to close valve stem 165 when handle 140 is operated to the water off position.

Referring now to FIG. 7, a perspective exploded view shows a schematic of one embodiment of valve manifold 250 and valve body 162. Valve manifold 250 has a manifold body 252 with a hollow cylindrical shape sized to receive valve body 162 therein. A first liquid inlet 254 and a second liquid inlet 256 each connect to a bottom portion 252a of manifold body 252 to supply a first liquid (e.g., cold water) and a second liquid (e.g., hot water) to valve body 162. A liquid outlet 258 also connects to bottom portion 252a of manifold body 252 to deliver liquid(s) permitted to pass through valve assembly 160. Optionally, liquid outlet 258 connects to a U-shaped junction connector 260 and to a liquid delivery conduit 262 to spigot 118.

In use, single lever faucet 100 uses indexed flow to save water by giving the user more control over the flow rate. Embodiments of single lever faucet 100 have handle 140 that is normally in a neutral handle position (e.g., horizontal), whether the water is off or whether the water is on. Using a biasing member 172, handle 140 is biased to a neutral handle position and can be pushed up to a water on position to open water flow or pushed down to a water off position to close water flow. When handle 140 is released, it returns to the neutral handle position.

Figure 8:
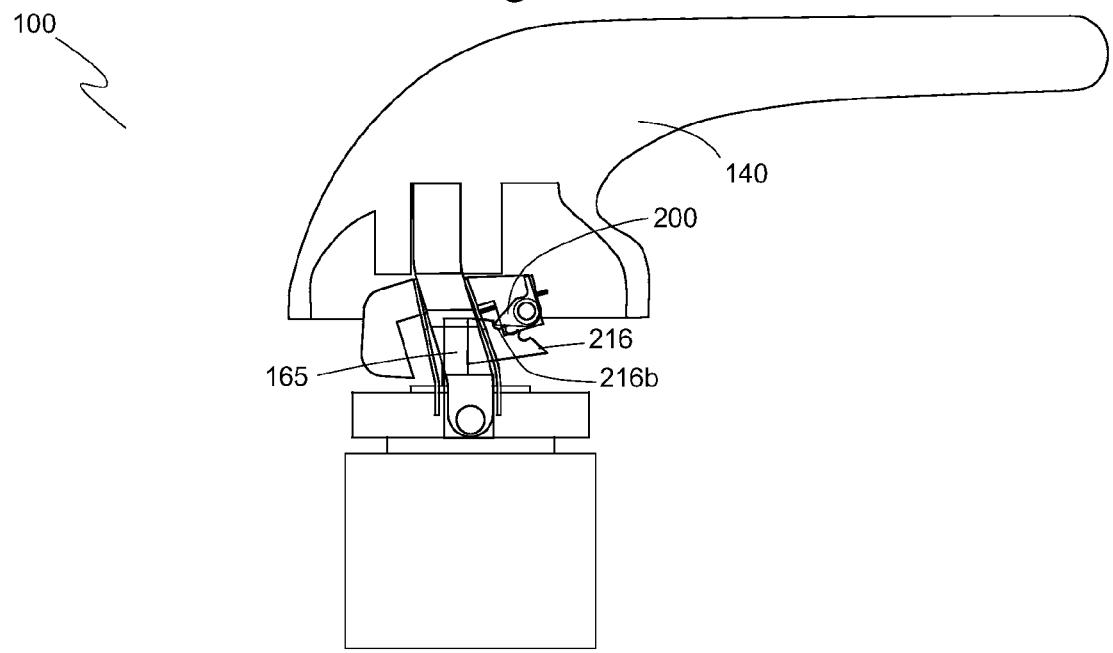
FIG. 8 is a side view showing a valve assembly and handle in a water off position.

Referring to FIG. 8, a side view shows single lever faucet 100 with handle 140 in a neutral handle position with water flow off as indicated by valve stem 165 being in a vertical or water off position. Pawl 200 engages or is positioned to engage a first one of the detents 216*b* or teeth 216*a* on actuator cam 216.

Figure 9:
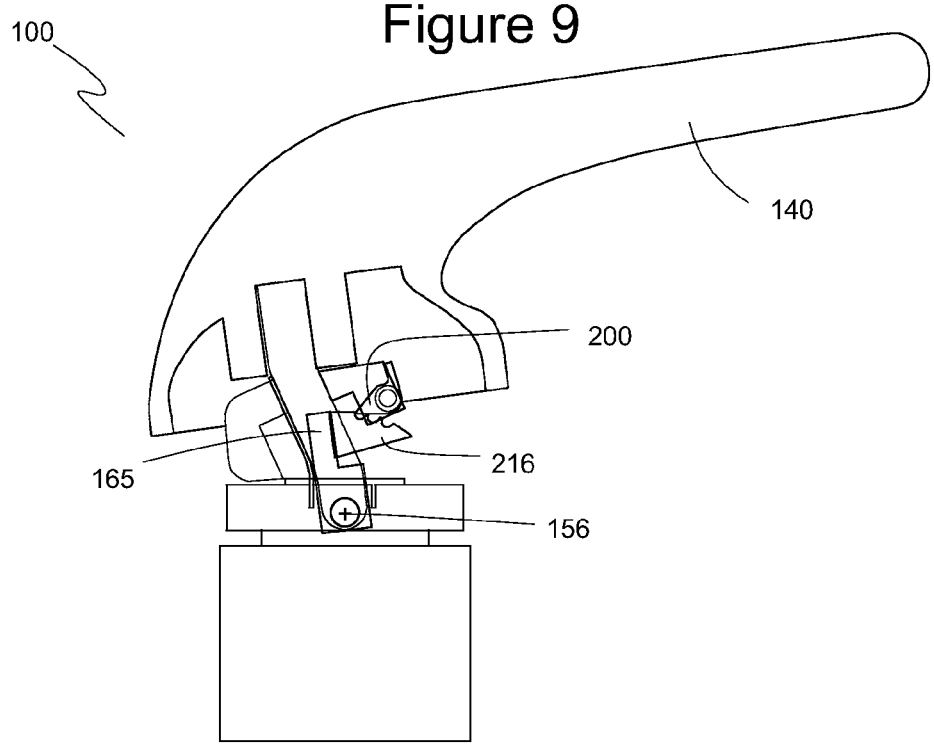
FIG. 9 is a side view showing the valve assembly and handle in a water on position.

Referring to FIG. 9, a side view illustrates single lever faucet 100 with handle 140 in a water on position. With handle 140 pushed upwards, handle actuator 180, pawl mounting bracket 190, and pawl 200, which are all connected, rotate about transverse pivot axis 156 by an amount determined by the throw of handle 140. This rotation moves actuator cam 216, which is attached to valve stem 165, causing valve stem 165 to open and allow water to flow at a rate R1 proportional to this valve opening. Rate R1 is the lowest rate of flow and is ideal for activities such as brushing one's teeth.

Figure 10:
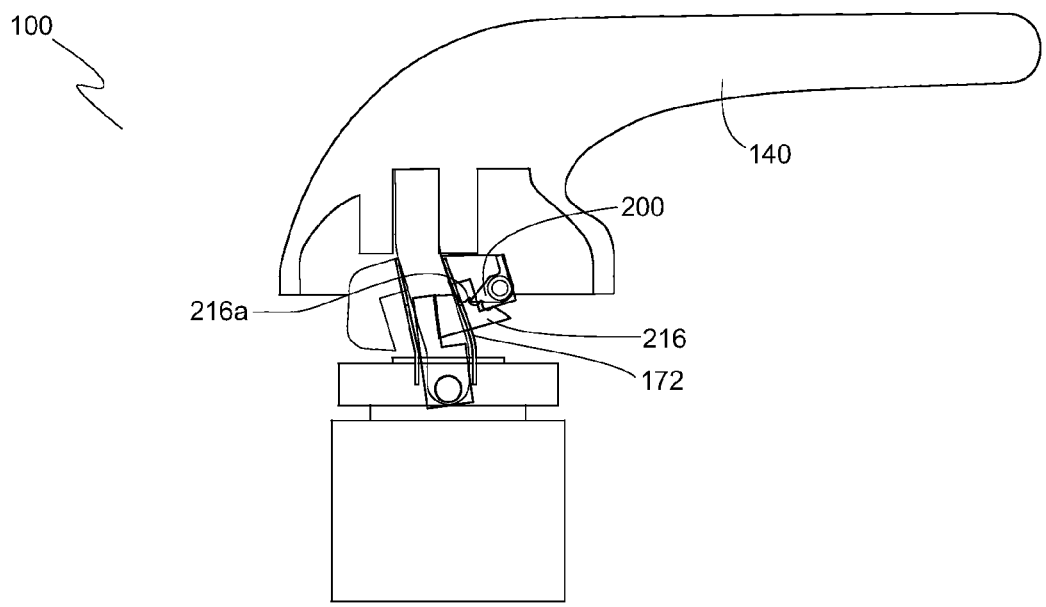
FIG. 10 is a side view showing the valve assembly and handle with the handle returned to the neutral handle position and the valve still in the water on position.

Referring to FIG. 10, single lever faucet 100 is shown with handle 140 having returned to the neutral handle position. When handle 140 was released after being lifted to the water on position shown in FIG. 9, biasing member 172 returned handle 140 to the neutral handle position. Pawl 200 is now engaging or positioned to engage the second one of detent 216*b* or tooth 216*a* of actuator cam 216 in preparation for the next index move, if any, of handle 140 upward to the water on position.

Figure 11:
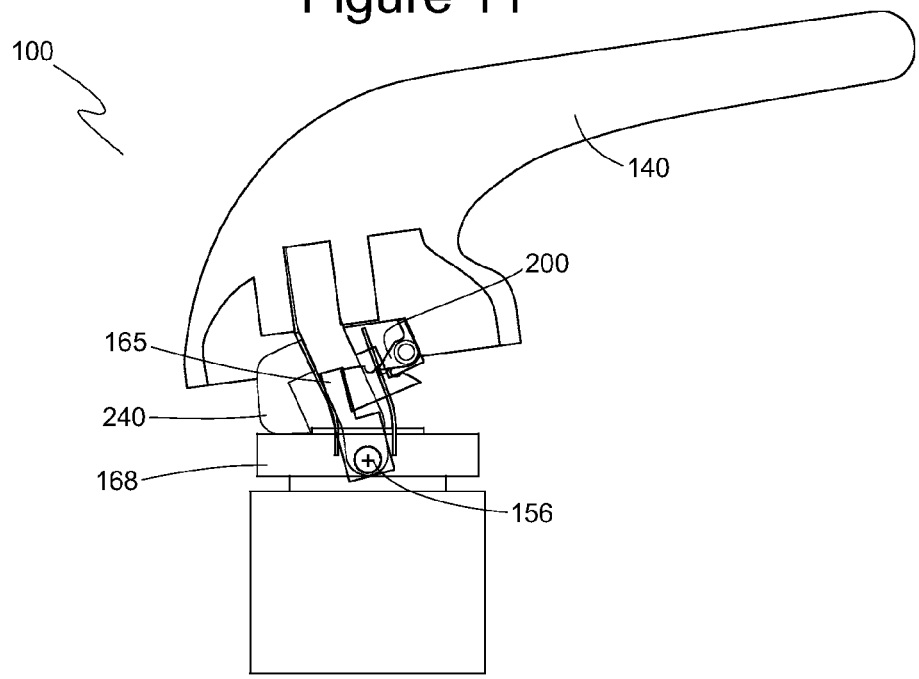
FIG. 11 is a side view showing the valve assembly and handle with the handle operated a second time to a water on position and the valve assembly moved incrementally to a second water on position.

Referring to FIG. 11, single lever faucet 100 is shown again in the water on position after the first return to the handle neutral position. When handle 140 is raised and released a second time, valve stem 165 is further rotated about transverse pivot axis 156 to a second water on position. The flow rate is increased incrementally to a flow rate R2 (e.g., medium flow) suited to quickly filling a coffee cup or small vessel, for example. As with each open position, valve closing member 240 contacts actuator member 168 to define the end point of the range of motion ("throw") of handle 140.

Figure 12:
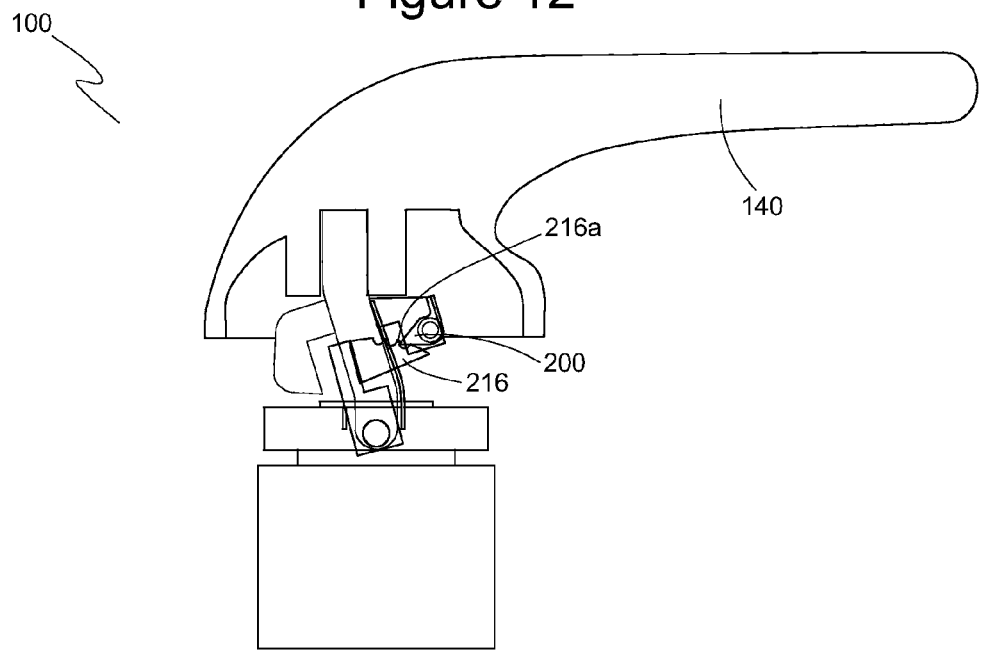
FIG. 12 is a side view showing the valve assembly and handle with the handle returned to the neutral handle position after being operated the second time to the water on position and where the valve assembly remains in the second water on position.

Referring to FIG. 12, single lever faucet 100 is shown with handle 140 having returned a second time to the neutral handle position. Pawl 200 is now engaging or positioned to engage the third one of detent 216*b* or tooth 216*a* of actuator cam 216 in preparation for the next operation of the handle 140, if any.

Figure 13:
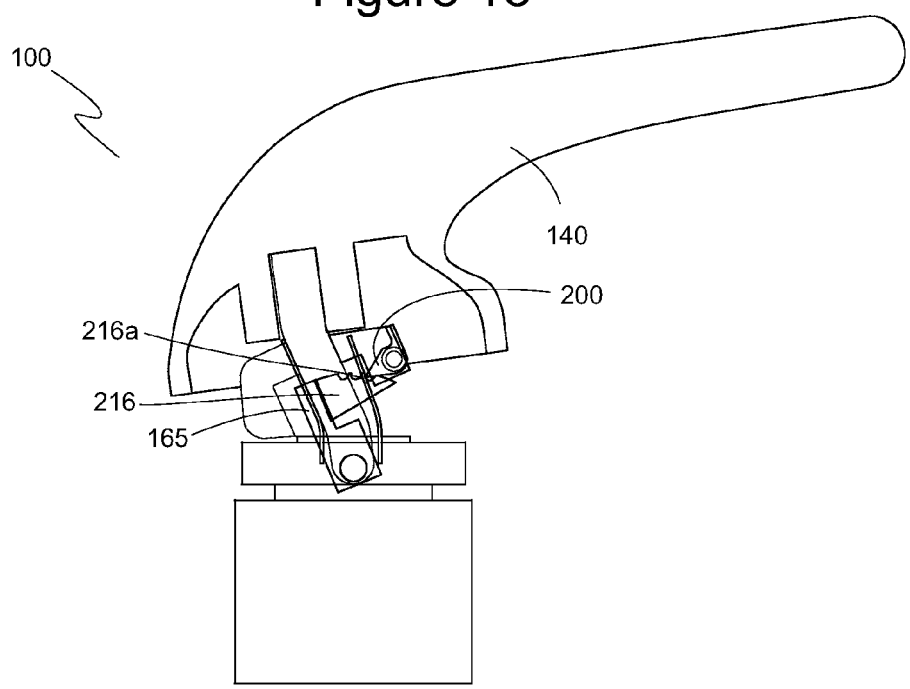
FIG. 13 is a side view showing the valve assembly and handle with the handle operated a third time to a water on position and the valve incrementally adjusted to the third water on position.

Referring to FIG. 13, single lever faucet 100 is shown in the water on position a third time. When handle 140 is operated upward to the open position a third time, it increases the flow to a maximum flow rate R3, useful for filling large vessels or other situations in which large flow rates are required or desired. Valve stem 165 is pivoted to its fully-open water on position. Pawl 200 remains engaged in the third tooth 216*a* of actuator cam 216.

Figure 14:
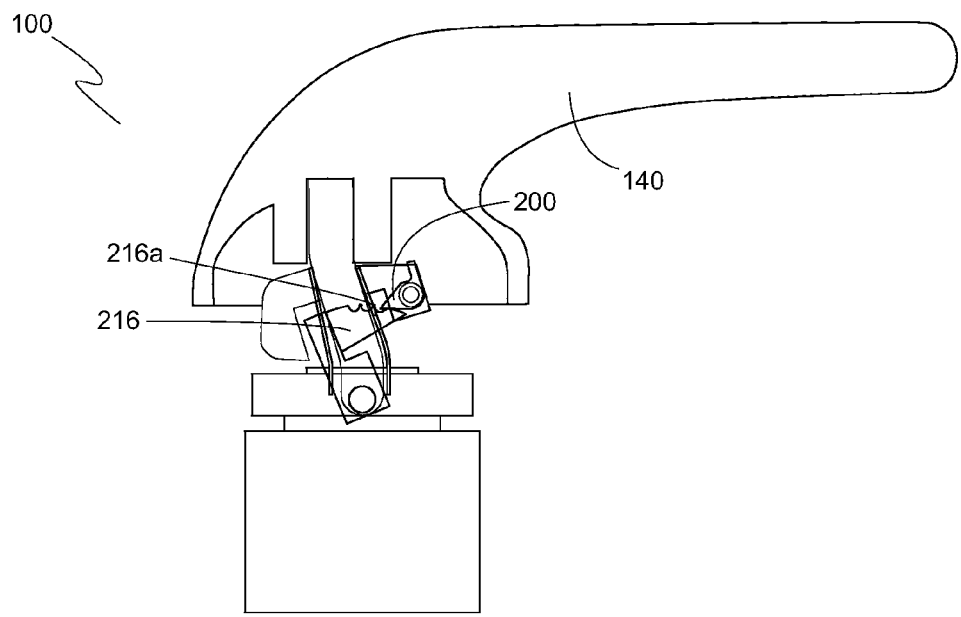
FIG. 14 is a side view showing the valve assembly and handle with the handle returned to the neutral handle position and the valve assembly remaining in the third water on position.

Referring to FIG. 14, single lever faucet 100 is shown with handle 140 having returned a third time to the neutral handle position. With no further detent 216*b* or tooth 216*a* to engage, pawl 200 is now abutting the third one of detent 216*b* or tooth 216*a*.

Figure 15:
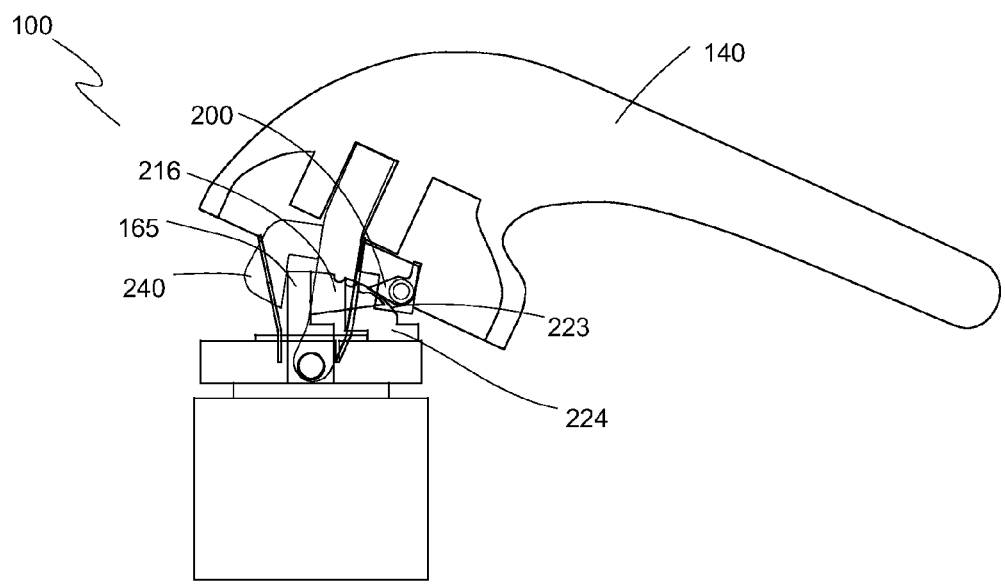
FIG. 15 is a side view showing the valve assembly and handle in a water off position.

Referring to FIG. 15, single lever faucet 100 is shown with handle 140 in the down or water off position. At any point during operation of single lever faucet 100, pushing handle 140 down will cause valve closing member 240 to engage and pivot valve stem 165 to the vertical or water off position, thereby causing the flow to stop completely. When handle 140 is pushed down, pawl release cam 224 also disengages pawl 200 from actuator cam 216 since pawl release surface 223 engages pawl 200 and pivots it against bias of biasing member 210 (shown in FIGS. 4-6) to a position of disengagement.

It is contemplated that single lever faucet 100 is not limited to three indexed levels of flow. Embodiments of single lever faucet 100 can accommodate more or fewer indexed flow steps as required. It should also be noted that with proper ratchet assembly design, the incremental flow rates can increase by dissimilar amounts from one flow rate to the next. Accordingly, water flow increases need not be linear increments. For example, the detents 216*b* and teeth 216*a* could be spaced such that the first open position allows two gallons per minute (GPM) to flow, the second open position allows eight GPM and the third open position allows 15 GPM and so on. Conversely, with a linear flow rate increase, detents 216*b* and teeth 216*a* would be evenly spaced and the flow rate increase for each operation of handle 140 upward to the open position would be the same increase in flow rate. Therefore, linear flow rate increases could provide flow rates R1, R2, and R3 of five, ten, and fifteen GPM, respectively.

Figure 16:
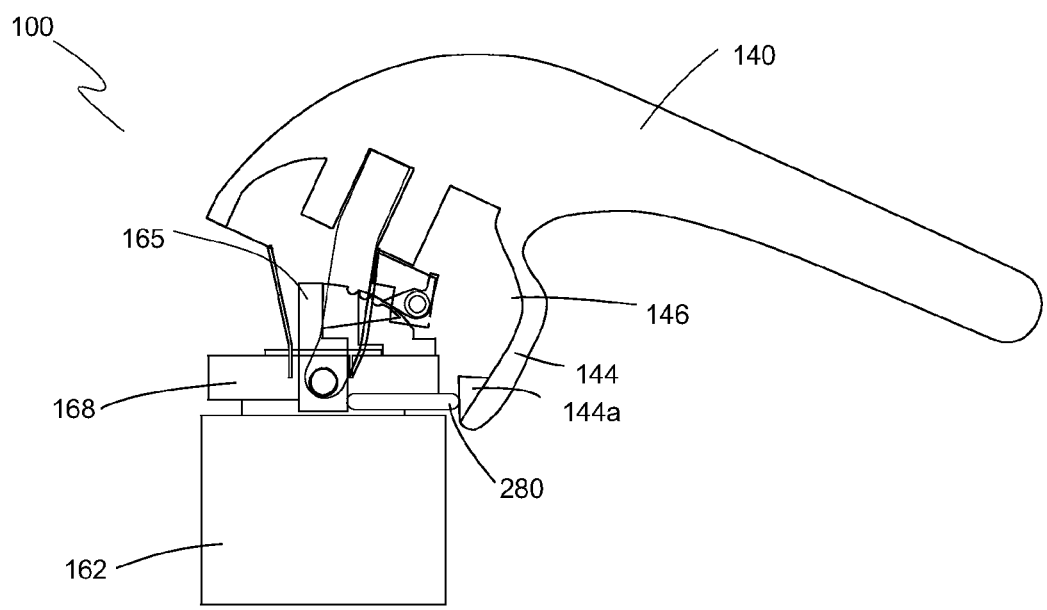
FIG. 16 is a side view of another embodiment of the valve assembly showing the valve assembly and handle in a water off position.

Referring to FIG. 16, another embodiment of single lever faucet 100 is shown. In this embodiment, valve assembly 160 includes a different type of valve closing member 240. Instead of the L-shaped design discussed above, valve closing member 140 in this embodiment is a closing member pin 280 that is slidably received in valve assembly 160. In one embodiment, closing member pin 280 extends through actuator member 168 to contact valve stem 165. When handle 140 is operated to the water off position, a sloped protrusion 144*a* on handle 140 extends into hollow region 146 of handle body 144 and engages closing member pin 280 to advance it towards lower portion 165*c* of valve stem 165, thereby causing valve stem 165 to pivot to its vertical or water off position.

In another aspect of the present invention, embodiments of single lever faucet 100 include a hot water bypass feature that enables rapid delivery of hot water. Particularly in cold climates, waiting for the hot water to arrive at the faucet is frustrating to the user. With low water flow rates, hot water takes that much longer to arrive at the faucet. This frustration inclines users to run the faucet at maximum flow all the time, therefore wasting water.

The hot water bypass feature avoids this waste of water. The faucet handle can be rotated substantially all the way to the 'hot' position and the handle operated once to turn on the water. Without a hot water bypass feature the water flows at flow rate R1. When single lever faucet 100 includes the hot water bypass feature, the indexed flow is bypassed and the water flow rate is the maximum flow rate with all the water coming from the hot water source. This feature allows the hot water to be drawn to the faucet as quickly as possible.

Figure 17:
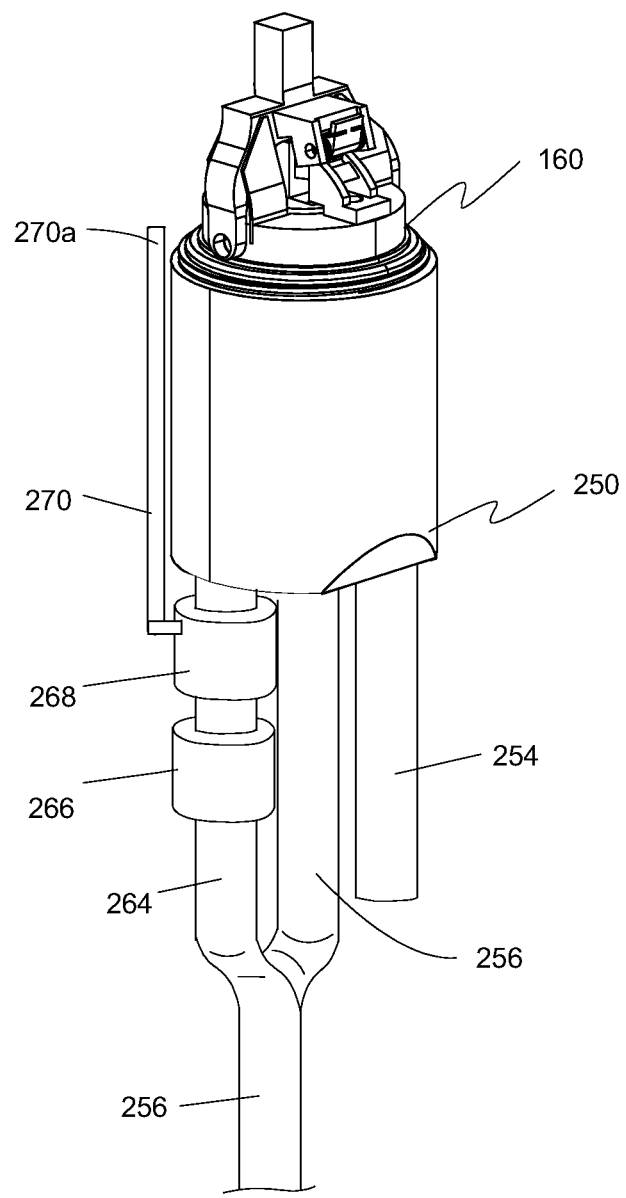
FIG. 17 is a perspective view of a valve assembly and valve manifold of the present invention showing components of a hot water bypass feature.

Referring now to FIG. 17, a perspective view shows another embodiment of valve manifold 250 with water control assembly 160. In this embodiment, second liquid inlet 256 is a hot water inlet and includes a hot water bypass inlet 264 that splits off from second liquid (hot) inlet 256. Hot water bypass inlet 264 includes a thermostatic valve 266 is disposed in the flow path of hot water bypass inlet 264. Hot water bypass inlet 264 also has a bypass valve 268 disposed in the flow path of hot water bypass inlet 264, typically between thermostatic valve 266 and valve manifold 250. A bypass valve actuator 270 connects bypass valve 268 to actuator member 168.

In another embodiment, bypass valve actuator 270 connects to handle 140 or other component of single lever faucet 100 that rotates with handle 140 to a hot water position. In yet another embodiment, bypass valve actuator 270 is a rod that engages handle 140 when handle 140 is in the 'hot' position and is also moved to the open position. For example, a protrusion, surface, or other part of handle 140 on handle body 144 contacts and pushes down (or pulls up) bypass valve actuator 270 when handle 140 is operated to the open position, thereby opening (or closing) bypass valve 268. The location of bypass valve 268 determines whether it is opened or closed when handle is in the 'hot' position and whether valve actuator 270 moves up or down to achieve that result. It is contemplated that bypass valve 268 can optionally be a solenoid or electronic valve that is actuated in response to electrical input from a sensor or other device that indicates handle 140 is in the 'hot' position and also in the open or further-open position.

In one embodiment, bypass valve 268 is any type of selector valve having an open and a closed position. Bypass valve 268 could be substituted by a plurality of individual valves of any type, such as solenoid valves, that open or close as needed to divert water flow to the desired path. Thermostatic valve 266 is any type of valve that opens and closes at certain temperatures with binary actuation, including a thermostatic poppet valve, an electronically-controlled valve with temperature sensing capability, and an electro-mechanical valve. With binary actuation, thermostatic valve 266 is either fully open or fully closed. Thermostatic valve 266 can be a valve similar to those used in automobile cooling systems.

When handle 140 rotates fully (or nearly fully) to a hot water position, bypass valve actuator 270 opens bypass valve 268 to permit water from the hot water source to bypass the restricted flow set by valve stem 165 caused by water flow control assembly 160 and instead flow freely through valve manifold 250 to spigot 118. When the water from the hot water source is cold, thermostatic valve 266 remains open, allowing the cold water in the hot water supply line to pass quickly to spigot 118. As the water temperature increases, thermostatic valve 266 closes, shutting off the water flow through hot water bypass inlet 264 and causing the hot water to instead pass through second (hot) water inlet 256 and through valve body 162 at the flow rate of the water flow control assembly 160.

When handle 140 is rotated to the hot position, a "land" or protrusion present in handle 140 aligns with bypass valve actuator 270. In one embodiment, the "land" is an arc of material on the bottom, rear portion of valve body 144 and that starts somewhat left of the middle position of handle 140 when handle 140 is viewed from above. For example, the land is an arc of material that extends from about the nine-o'clock position to about the eleven-o'clock position of handle body 144 as viewed from above. The actual start angle of the land can be varied to the manufacturers' preferences. Lifting the handle in this range of positions engages the top end 270a of bypass valve actuator 270 and pushes it down, thus actuating the bypass valve 268. When the handle is to the right of this range of positions, the rod will not be engaged when the handle is lifted (there is no land to engage the actuator rod) and the bypass valve will not be actuated.

The hot water bypass feature is optional on single lever faucet 100. It is an add-on feature to single lever faucet 100 that functions normally without the hot water bypass feature where the add-on feature includes any connectors or other structures necessary to accept this added feature without any modifications to the water flow control assembly 160.

In another aspect of the present invention, embodiments of single lever faucet 100 are constructed to allow the user to achieve the maximum flow rate without having to incrementally increase water flow by operating handle 140 multiple times. For example, when a user wishes to fill a large vessel, it can be bothersome to operate handle 140 three times to incrementally open the valve assembly 160 to reach the maximum flow rate.

Figure 18:
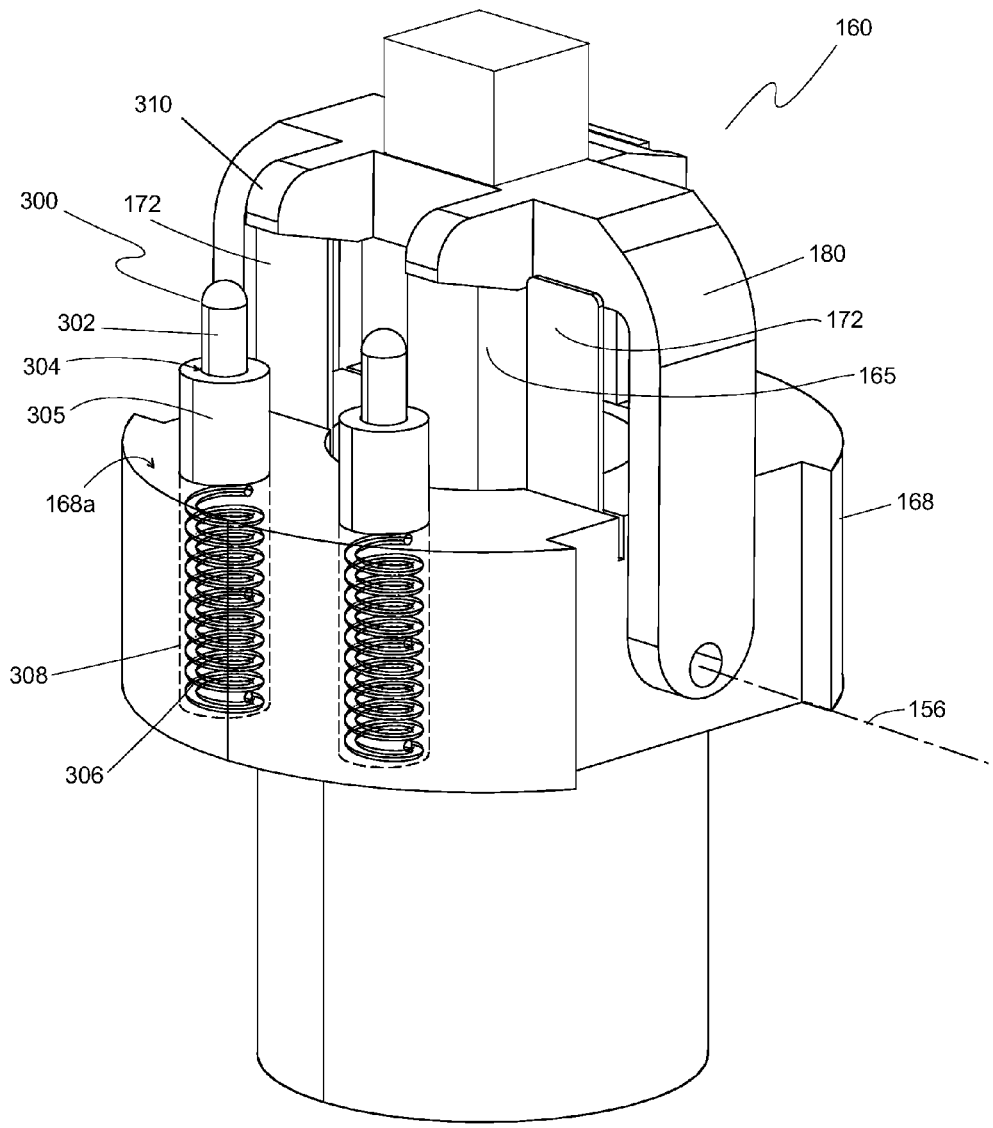
FIG. 18 is a rear, perspective view of another embodiment of a valve assembly of the present invention shown with a resistance mechanism.

Referring to FIG. 18, a rear perspective view shows another embodiment of valve assembly 160 with a resistance mechanism 300 on actuator member 168. This embodiment provides force feedback to the user when handle 140 is moved to a further-open position beyond the water on position.

Resistance mechanism 300 includes a return pin 302 protruding from an opening 304 in a pin housing 305 attached to top surface 168a of actuator member 168. A return spring 306 is disposed in a spring bore 308 extending into actuator member 168. Return spring 306 biases return pin 302 to protrude through pin openings 304. In one embodiment, two such resistance mechanisms 300 are included as shown in FIG. 18.

When handle 140 (shown in FIG. 3) is pushed upwards to the open position, handle actuator 180 rotates about transverse pivot axis 156 so that handle actuator 180 engages return pin 302. The initial resistance encountered by the user from this contact typically causes the user to stop pushing and release handle 140. However, if handle 140 is pushed harder, handle 140 can be moved past this point to the further-open position. When this is done, the water will flow at maximum rate for as long as handle 140 is held in the further-open position To facilitate contact between handle actuator 180 and resistance mechanism 300, a boss or protrusion 310 on handle actuator 180 is positioned to engage return pin 302. Return spring(s) 306 has a spring constant that is greater than that of biasing member 172. Protrusion 310 is positioned so as to engage return pin 302 at the usual end of the handle's throw from the neutral handle position to the water on position. Resistance mechanism 300 allows handle 140 to move beyond the water on position to a further-open position at which point valve stem 165 is fully open. At the end of this throw to the further-open position, protrusion 310 engages pin housing 305, which provides a hard stop to operation of handle 140.

When handle 140 is released from the further-open position, it returns to the neutral position and the water will flow at the rate that it would have flowed if handle 140 had been operated only to the incremental water on position. Thus, the further-open position with maximum flow rate can be used from valve stem 165 being in a water off position or any less-than-fully-open water on position. For example, if the water was off and handle 140 is operated to the maximum flow point of the further-open position, water will flow at flow rate R1 when handle 140 is released and returns to the neutral handle position. In order to shut off the water, handle 140 would have to be pressed down to the closed or water off position, as described above.

One advantage of force feedback is that the operation of handle 140 provides analog feedback or feedback that is perceptible along a continuous range of further-open positions. If desired, the user can still control the water flow rate in the traditional manner (e.g., fully open or completely off) without changing the user's already-learned behavior. Based on force feedback from the faucet, however, the user will be aware (at some level either conscious or subconscious) of the amount the valve is open.

In the force-feedback approach, the more that handle 140 is pushed up, the more resistance in operation of handle 140.

When using one or more springs to provide resistance to handle 140, the force of each spring is proportional to the distance the spring is displaced. Therefore, the user experiences continually-increasing resistance when handle 140 is operated beyond the water on position. The increasing resistance to the operation of the handle will cause the user to pay attention (even subconsciously) to the handle position, therefore stopping well before the handle's end of travel and resulting in reduced water usage. Even though handle 140 is capable of being pushed open all the way to its limit for maximum flow, doing so becomes a conscious act due to the increased resistance.

Water back-pressure and mechanical feedback are two methods of force feedback. The back pressure method is mechanically more complex to design and perhaps to manufacture. The concept is to use increased water flow from the faucet to create resistance to the upward motion of handle 140.

For example, a pin, plate, or other mechanism (not shown) changes position in response to water pressure. As water pressure increases, the mechanism advances towards return spring 306 to establish the "floor" of spring bore 308. When the depth of spring bore 308 changes in response to water pressure, the force on handle 140 from return spring 306 also is based on water pressure.

To use water back-pressure, the resistance of handle 140 is the same at a given flow rate even with differences in supply water pressure. For a given flow rate, the resistance on the handle is the same, whether that flow occurs in an area of higher supply pressure or in an area of lower supply pressure. In areas with higher water pressure, the water flow rate is greater through the faucet. As a result, the resistance for the given flow rate occurs earlier along the handle's throw due to the overall higher water flow rate in that locale. This is because in areas of higher water pressure the valve needs to open to a lesser extent to achieve a given flow rate than in areas of lower water pressure. Similarly, in areas of lower water pressure, the resistance for the given flow rate occurs later along the handle's throw due to the overall lower volume of water flow. Creating a higher resistance to the handle at higher flow rates of water causes the user to be aware of the increased water use. As a result of this awareness, the user tends to use less water.

The mechanical resistance method (e.g., resistance mechanism 300) is simpler to design and manufacture. The handle joint can be designed so as to increase resistance in a linear manner or according a specified curve with increased opening of the valve.

Figure 19:
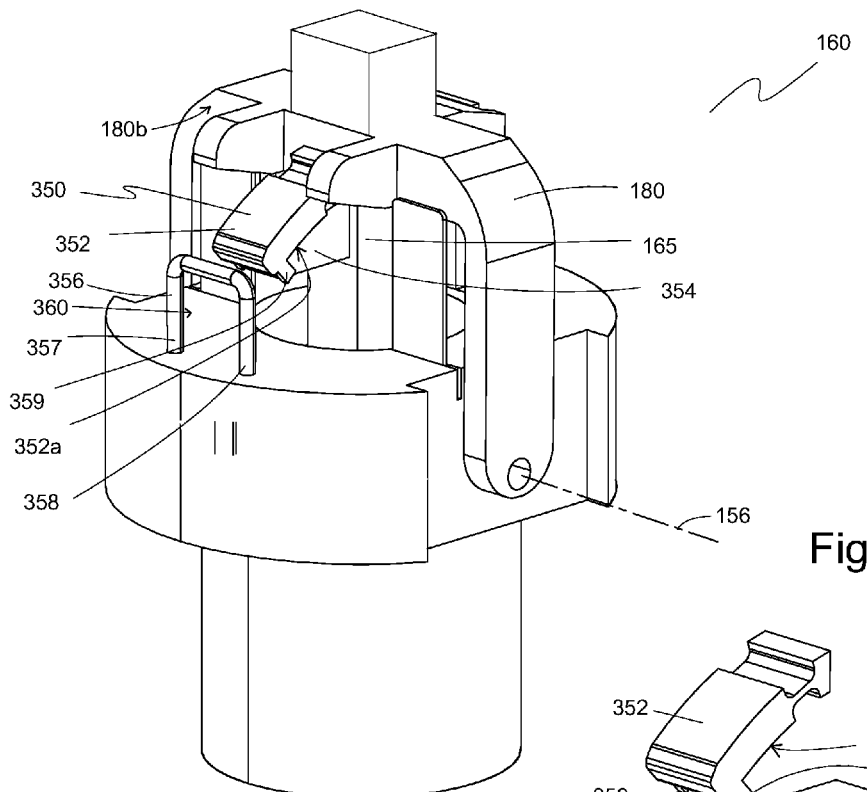
FIG. 19 is a rear, perspective view of another embodiment of a valve assembly of the present invention shown with an actuator clutch assembly.
Figure 19A:
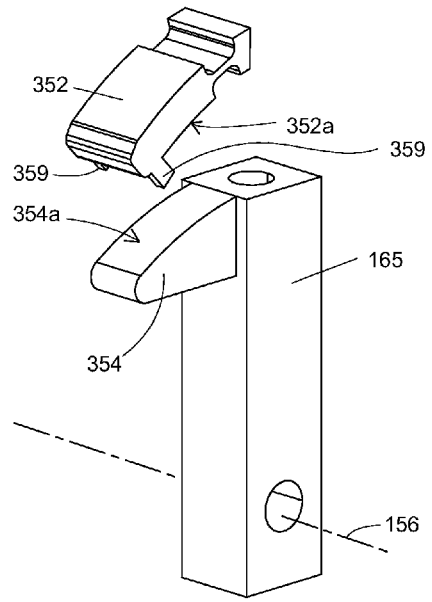
FIG. 19A is a rear, perspective view of a valve stem and portions of the actuator clutch assembly.

Referring now to FIG. 19, a rear perspective view shows another embodiment of valve assembly 160 with an actuator clutch assembly 350 connected to valve stem 165 and to handle actuator 180. Actuator clutch assembly 350 includes an upper catch member 352, a lower catch member 354, and a catch bar 356. Upper catch member 352, lower catch member 354, and valve stem 165 are also shown semi-exploded in FIG. 19A.

Upper catch member 352 is fixedly attached to handle actuator 180 and extends rearwardly and downwardly. In this embodiment, upper catch member 352 is attached to a back side 180b of transverse portion 186. In one embodiment, upper catch member 352 includes a clutch catch 359 extending from a bottom surface 352a of upper catch member 352. Clutch catch 359 is one or more protrusions, a lip, or other surface extending from upper clutch member 352 and adapted to engage valve stem 165 when handle 140 is operated to the water off position. Lower catch member 354 is fixedly attached to valve stem 165 and extends rearwardly therefrom in a wedge shape. Lower catch member 354 has a top surface 354a shaped to slidingly mate with bottom surface 352a of upper catch member 352, where top surface 354a and bottom surface 352a are capable of frictionally engaging one another. In the illustrated embodiment, bottom surface 352a and top surface 354a are curved with a radius of curvature approximately equal to the distance from the surface 354a, 352a perpendicularly to transverse pivot axis 156.

In one embodiment, clutch bar 356 has an inverted-U shape with ends 357, 358 fixedly attached to actuator member 168 and defining a clutch bar opening 360 between clutch bar 356 and actuator member 168. When handle actuator 180 is in the neutral handle position, bottom surface 352a of upper clutch member 352 is sufficiently separated from top surface 354a of lower clutch member 354 so that when handle 140 is moved to the open position, upper clutch member 352 fails to frictionally engage lower clutch member 354. That is, the frictional engagement between bottom surface 352a and top surface 354a is insufficient to cause lower clutch member 354 (and valve stem 165) to move together with upper clutch member 352.

Figure 20:
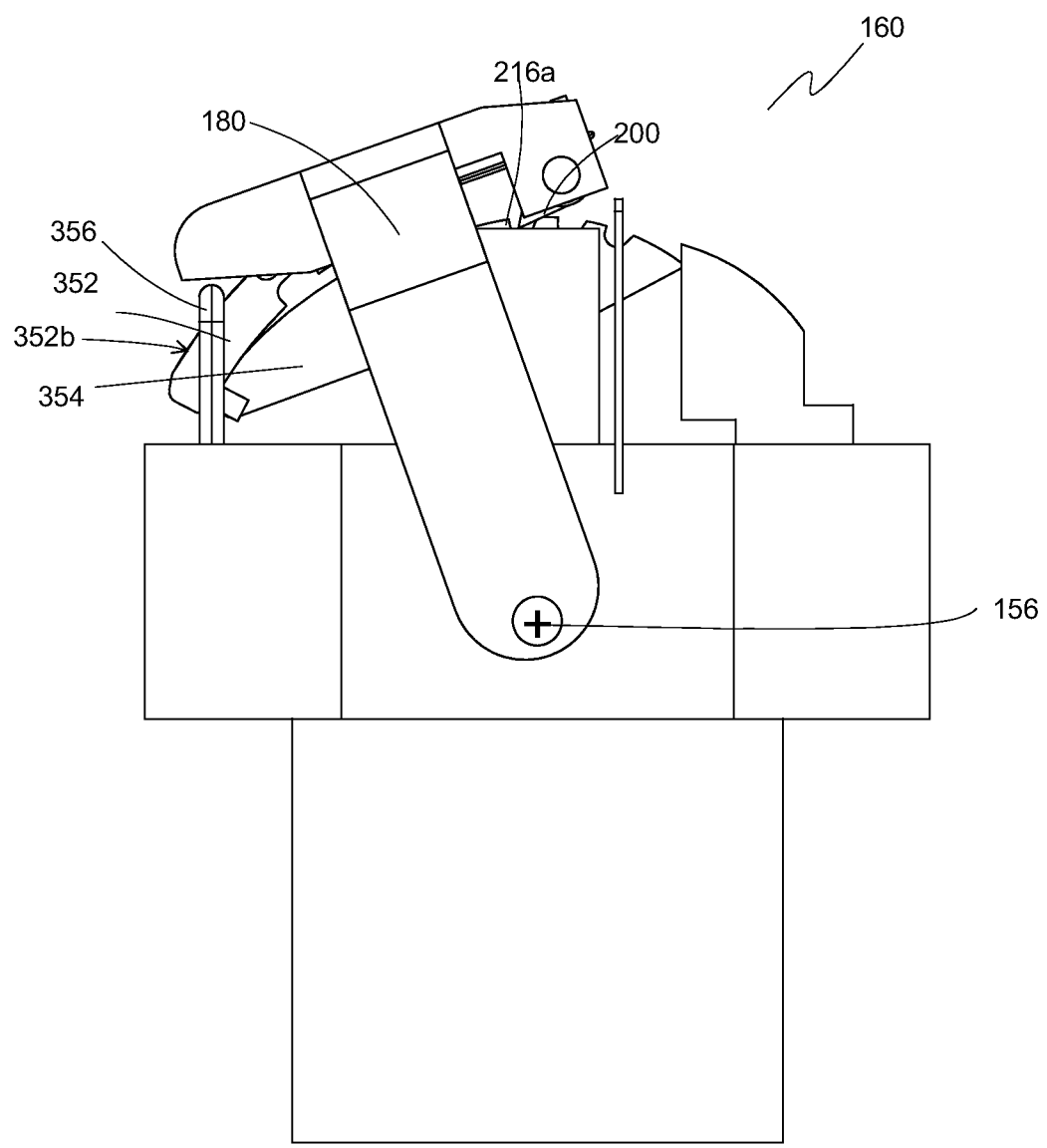
FIG. 20 is a side view of the valve assembly of FIG. 19 showing the valve stem in a further open position and the upper clutch member frictionally engaging the lower clutch member.

Referring now to FIG. 20, a side view illustrates valve assembly 160 of FIG. 19 with handle actuator 180 in a further-open position. The further-open position is when handle actuator 180 is pivoted about transverse pivot axis 156 towards clutch bar 356 beyond the water on position. In the further-open position, upper catch member 352 enters clutch bar opening 360 and top surface 352b of upper catch member 352 contacts clutch bar 356, which causes upper catch member 352 to frictionally engage lower catch member 354. This frictional engagement causes lower catch member 354 (and valve stem 165, not visible) to also pivot towards clutch bar 356, thereby further opening valve lever 165. When a user moves handle 140 to the end point of the further-open position, valve assembly 160 is open to its maximum flow rate.

As the user releases handle 140, bias member 172 returns handle actuator 180 to the neutral position. Due to the flexibility and resiliency of upper catch member 352, upper catch member 352 ceases to frictionally engage lower catch member 354 upon reaching the water on position during the return of handle actuator 180 from the further-open position to the neutral handle position. From any indexed water on position, the user may move handle 140 to the further-open position to achieve maximum flow and with valve assembly 160 returning to the indexed flow position of the just-previous open position when handle 140 returns to the neutral handle position.

Figure 21:
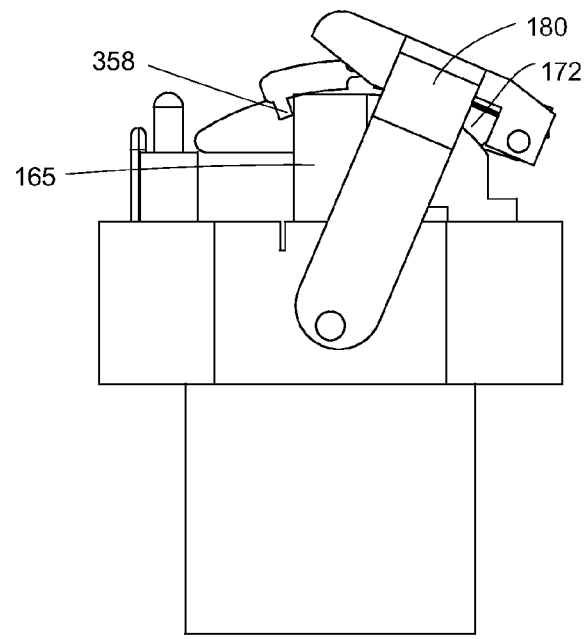
FIG. 21 is a side view of the valve assembly of FIG. 19 in a water off position where the upper clutch member is engaging the valve stem and has moved it to a water off position.

Referring to FIG. 21, a side view shows valve assembly 160 of FIG. 19 with handle actuator 180 in the water off position. When the user moves handle 140 (not shown) to the water off position, clutch catch 358 engages valve stem 165 and pivots valve stem 165 to the vertical or water off position. Bias member 172 then returns handle 140 and handle actuator 180 to the neutral handle position with valve stem 165 in the water off position. Pawl 200 is engaging or in position to engage the first detent 216b and tooth 216a of actuator cam 216 (shown in FIG. 19) in preparation for operation to the water on position. Thus, the user may shut off the water at any time from the further-open position (or from any indexed-flow position) by operating handle 140 to the water off position.

Figure 22:
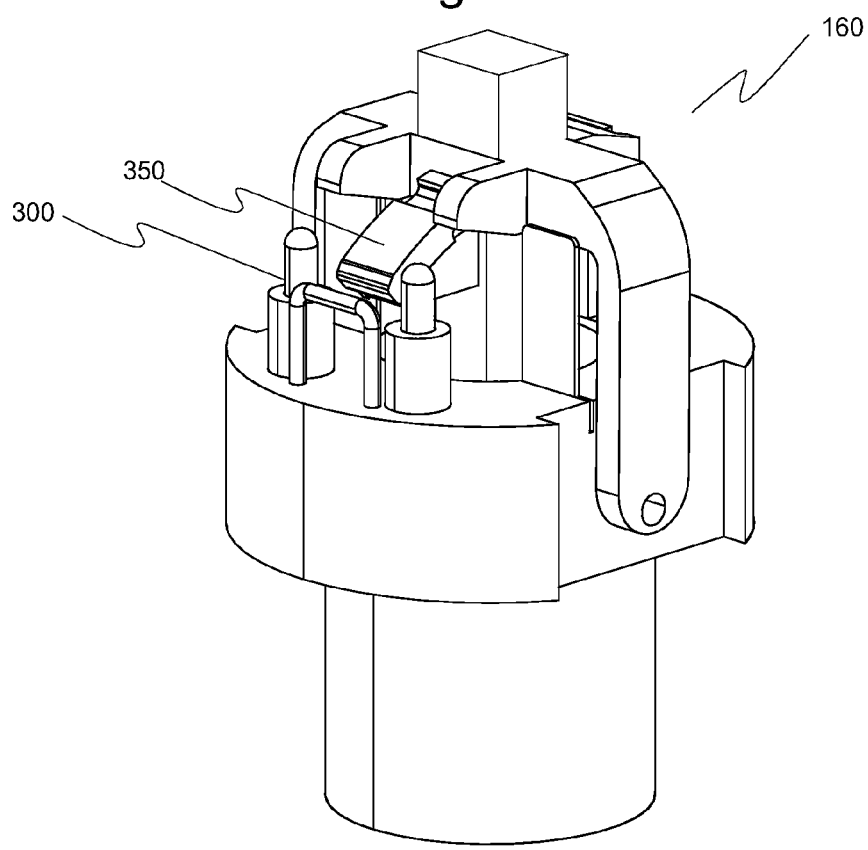
FIG. 22 is a rear, perspective view of another embodiment of a valve assembly of the present invention that includes both the resistance mechanism and the actuator clutch assembly.

Referring to FIG. 22, a rear perspective view shows a one embodiment of valve assembly 160 that includes both of resistance mechanism 300 and actuator clutch assembly 350. The combined result is that the increased resistance of moving handle 140 to the further-open position causes the user to be aware of the water flow rate, and therefore more attentive to conserving water.

Although various embodiments of the present invention have been described herein, the above description is merely illustrative. Further modification of the invention herein disclosed will occur to those skilled in the respective arts and all such modifications are deemed to be within the scope of the invention as defined by the appended claims.

What is claimed is:

1. A water flow control assembly for a single lever faucet, the assembly comprising:
   a faucet valve coupler adapted to operatively connect a handle of a single lever faucet to a valve stem of a valve assembly of the single lever faucet and to engage the valve assembly of the single lever faucet, the faucet valve coupler having an actuator element and a handle actuator wherein the actuator element supports the handle actuator wherein the faucet valve coupler provides a biasing resistance to handle movement as the handle is oriented in a position other than a neutral handle position;
   a cam mechanism having a valve stem portion and a handle portion, the cam mechanism being operatively connected to the valve stem of the valve assembly wherein the cam mechanism engages the valve stem to move the valve stem to a predefined open position in response to activation of the handle of the single lever faucet by a user when the handle is moved from the neutral handle position to a water on position wherein the predefined open position provides water flow that is less than a full open water flow,
   wherein the handle automatically returns to a neutral handle position with the water flowing after engagement of the handle by the user to any water on position followed by release of the handle by the user;
   wherein the handle automatically returns to the neutral handle position with no water flowing after engagement of the handle by the user to the water off position followed by release of the handle by the user; and
   wherein the handle automatically returns to the neutral handle position with some water flowing after engagement of the handle by the user to a position less than fully off, followed by release of the handle by the user.

2. The assembly of claim 1 wherein the cam mechanism is selected from the group consisting of a ratchet assembly, a plate cam, a cylindrical cam, a face cam, and a linear cam.

3. The assembly of claim 1 wherein the cam mechanism has a cam driving mechanism selected from the group consisting of mechanical, electro-mechanical and electrical.

4. The assembly of claim 1 wherein the cam mechanism includes a ratchet assembly comprising an actuator cam having a plurality of detents, the actuator cam being directly connected to the valve stem, a pawl with a detent engaging portion that selectively engages with one of the plurality of detents, a pawl biasing member connected to the pawl and oriented to bias the detent engaging portion of the pawl into one of the plurality of detents, and a pawl release cam having a pawl release surface that is engaged by the detent engaging portion of the pawl causing the pawl to orient into a detent release position when the handle is moved from the neutral position to a water off position.

5. The assembly of claim 1 further comprising a valve closing element having a valve closing surface that engages the valve stem to orient the valve stem to a water off position when the handle of the single lever faucet is moved to the water off position.

6. The assembly of claim 5 wherein the valve closing element is selected from the group consisting of an angled handle surface on an inside portion of the handle that engages the handle actuator which has the valve closing surface that contacts the valve stem when the handle of the single lever faucet is moved to the water off position, and a handle actuator member directly connected to the handle actuator wherein the handle actuator member has the valve closing surface that contacts the valve stem when the handle of the single lever faucet is moved to the water off position.

7. The assembly of claim 1, further comprising:
   a resistance mechanism on the valve assembly that provides increased resistance to the handle from when the handle is moved to a further-open position beyond the water on position.

8. The assembly of claim 7, further comprising:
   a handle actuator pivotably connected to the valve assembly, wherein the handle actuator engages the resistance mechanism when the handle is moved to the further-open position beyond the water on position.

9. The assembly of claim 8, wherein the resistance mechanism includes a spring positioned to engage the handle actuator when the handle is moved to a further-open position beyond the water on position.

10. The assembly of claim 7, wherein the resistance mechanism has a resistance that is proportional to a pressure of a liquid to be controlled by a faucet in which the water flow control assembly is incorporated.

11. The assembly of claim 1 further comprising an open flow water resistance mechanism having a return pin protruding from a pin housing attached to an actuator member and engageable by the handle actuator when a force is applied to the handle of the single-throw faucet that exceeds the force required to move the handle from the neutral handle position to a predefined water on position of the cam mechanism.

12. The assembly of claim 1 further comprising an actuator clutch assembly connected to the handle actuator and adapted for connection to the valve stem, the actuator clutch assembly having an upper clutch member fixedly attached to the handle actuator wherein the upper clutch member has a clutch catch extending from a bottom surface of the upper clutch member and adapted to engage the valve stem, a lower clutch member adapted for fixedly attaching to the valve stem having a top surface shaped to slidlingly mate with the bottom surface of the upper clutch member wherein the top surface and the bottom surface are adapted for frictionally engaging one another, and a catch bar defining a clutch bar opening wherein, when the upper clutch member enters the clutch bar opening, the top surface of upper clutch member contacts the clutch bar causing the upper clutch member to frictionally engage the lower clutch member.

* * * * *